United States Patent
Hoppe et al.

(10) Patent No.: US 12,145,215 B2
(45) Date of Patent: Nov. 19, 2024

(54) CONTROL METHOD, CONTROL DEVICE AND PRODUCTION APPARATUS

(71) Applicant: Nikon SLM Solutions AG, Luebeck (DE)

(72) Inventors: Andreas Hoppe, Luebeck (DE); Christiane Thiel, Luebeck (DE); Ann-Kathrin Otte, Luebeck (DE); Daniel Brueck, Luebeck (DE); Jan Wilkes, Luebeck (DE); Dieter Schwarze, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 673 days.

(21) Appl. No.: 17/432,216

(22) PCT Filed: Mar. 2, 2020

(86) PCT No.: PCT/EP2020/055386
§ 371 (c)(1),
(2) Date: Aug. 19, 2021

(87) PCT Pub. No.: WO2020/178216
PCT Pub. Date: Sep. 10, 2020

(65) Prior Publication Data
US 2022/0193769 A1    Jun. 23, 2022

(30) Foreign Application Priority Data

Mar. 4, 2019  (DE) .................... 10 2019 001 522.3

(51) Int. Cl.
*B23K 26/342*    (2014.01)
*B22F 10/28*     (2021.01)
(Continued)

(52) U.S. Cl.
CPC ............ *B23K 26/342* (2015.10); *B22F 10/28* (2021.01); *B22F 10/322* (2021.01);
(Continued)

(58) Field of Classification Search
CPC .................... B23K 26/342; B23K 26/082; B23K 26/0604; B23K 26/142; B22F 10/28;
(Continued)

(56) References Cited

U.S. PATENT DOCUMENTS

| 2018/0178284 A1 | 6/2018 | Martin et al. |
| 2018/0178285 A1 | 6/2018 | Martin et al. |
| 2018/0178286 A1 | 6/2018 | Martin et al. |

FOREIGN PATENT DOCUMENTS

| CN | 104029394 | 9/2014 |
| CN | 104775116 | 7/2015 |

(Continued)

OTHER PUBLICATIONS

International Search Report and Written Opinion for PCT/EP2020/055386, European Patent Office, Apr. 7, 2020.
(Continued)

*Primary Examiner* — Robert G Bachner
(74) *Attorney, Agent, or Firm* — Williams Mullen; Thomas F. Bergert

(57) ABSTRACT

The invention relates to a control method for controlling a multi-beam apparatus having one or more beam sources for producing a plurality of beams of a system for manufacturing a three-dimensional workpiece by means of an additive layer construction method, in which method a material that can be solidified in order to manufacture the three-dimensional workpiece is applied in layers to a surface of a carrier and the material that can be solidified is solidified by the plurality of beams in a respective layer at points of incidence
(Continued)

of the plurality of beams on the material that can be solidified, wherein the points of incidence of the beams for solidifying selective regions of the layers of the material that can be solidified in order to manufacture the three-dimensional workpiece are each controlled substantially against a gas flow direction of a gas flow over the surface of the carrier; wherein the control method comprises (a) dividing the material to be solidified in the respective layer into at least two sections, wherein two of the at least two sections extend in the gas flow direction of the gas flow prevailing over the two of the at least two sections in succession at least in part, (b) dividing at least one of the two of the at least two sections into at least two surface pieces, (c) assigning each of the surface pieces to exactly one specific beam, which solidifies the material to be solidified in the assigned surface piece, (d) controlling the points of incidence of the beams such that, at at least one point in time during an exposure of the material to be solidified, the material to be solidified is solidified in at least two surface pieces, and a network consisting of straight lines extending between each center point of the points of incidence to every other center point of the points of incidence, at no point in time during the exposure, in which all center points of the points of incidence are located outside of a predetermined distance from each other, has a straight line parallel to the gas flow direction of the gas flow prevailing over the two of the at least two sections.

20 Claims, 13 Drawing Sheets

(51) Int. Cl.
| | |
|---|---|
| *B22F 10/322* | (2021.01) |
| *B22F 10/366* | (2021.01) |
| *B22F 12/41* | (2021.01) |
| *B22F 12/45* | (2021.01) |
| *B22F 12/49* | (2021.01) |
| *B22F 12/70* | (2021.01) |
| *B22F 12/90* | (2021.01) |
| *B23K 26/082* | (2014.01) |
| *B29C 64/153* | (2017.01) |
| *B29C 64/268* | (2017.01) |
| *B33Y 30/00* | (2015.01) |

(52) U.S. Cl.
CPC ............ *B22F 10/366* (2021.01); *B22F 12/45* (2021.01); *B22F 12/70* (2021.01); *B23K 26/082* (2015.10); *B29C 64/153* (2017.08); *B29C 64/268* (2017.08); *B33Y 30/00* (2014.12); *B22F 12/41* (2021.01); *B22F 12/49* (2021.01); *B22F 12/90* (2021.01)

(58) Field of Classification Search
CPC ...... B22F 10/322; B22F 10/366; B22F 12/45; B22F 12/70; B22F 12/41; B22F 12/49; B22F 12/90; B29C 64/153; B29C 64/268; B29C 64/264; B29C 64/277; B29C 64/371; B29C 64/393; B33Y 30/00; B33Y 10/00; B33Y 50/02; Y02P 10/25
See application file for complete search history.

(56) References Cited

FOREIGN PATENT DOCUMENTS

| | | |
|---|---|---|
| CN | 104999670 | 10/2015 |
| CN | 105451971 | 3/2016 |
| CN | 105965015 | 9/2016 |
| CN | 107635749 | 1/2018 |
| CN | 108994452 | 12/2018 |
| DE | 102016222261 | 5/2018 |
| DE | 102017206792 | 10/2018 |
| DE | 102017212565 | 1/2019 |
| EP | 2878402 | 6/2015 |
| EP | 2961549 | 1/2016 |
| EP | 2967549 | 1/2016 |
| EP | 3218168 | 9/2017 |
| EP | 3378584 | 9/2018 |
| JP | 2018502216 | 1/2018 |
| JP | 2018030373 | 3/2018 |
| JP | 2018126985 | 8/2018 |
| JP | 2018127710 | 8/2018 |
| WO | 2018087556 | 5/2018 |
| WO | 2018172080 | 9/2018 |

OTHER PUBLICATIONS

German Search Report for International Application DE10 2019 001 522.3, German Patent and Trademark Office, Oct. 8, 2019.
China National Intellectual Property Administration, Chinese Examination Report for International Application No. 202080019138.X, Oct. 25, 2022.
Japanese Patent Office, Examination Report for JP 2021-552607, Dec. 27, 2022.

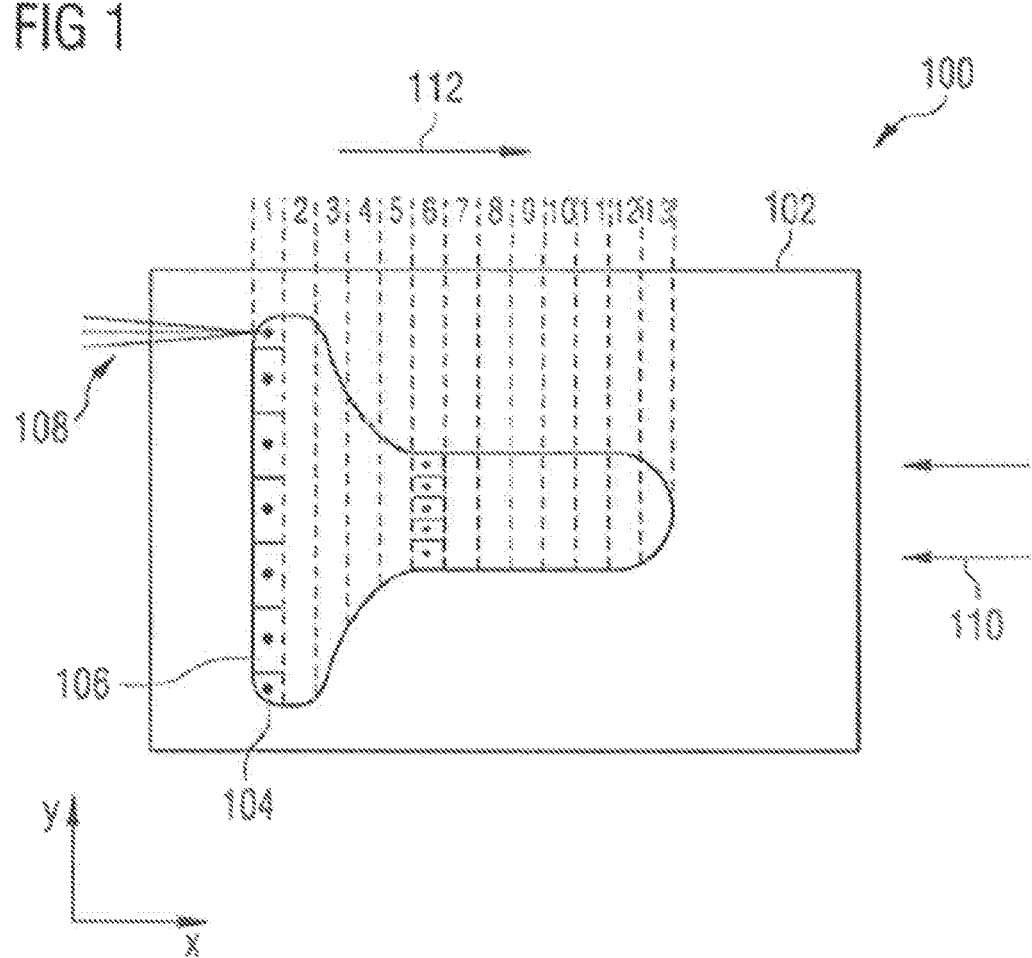

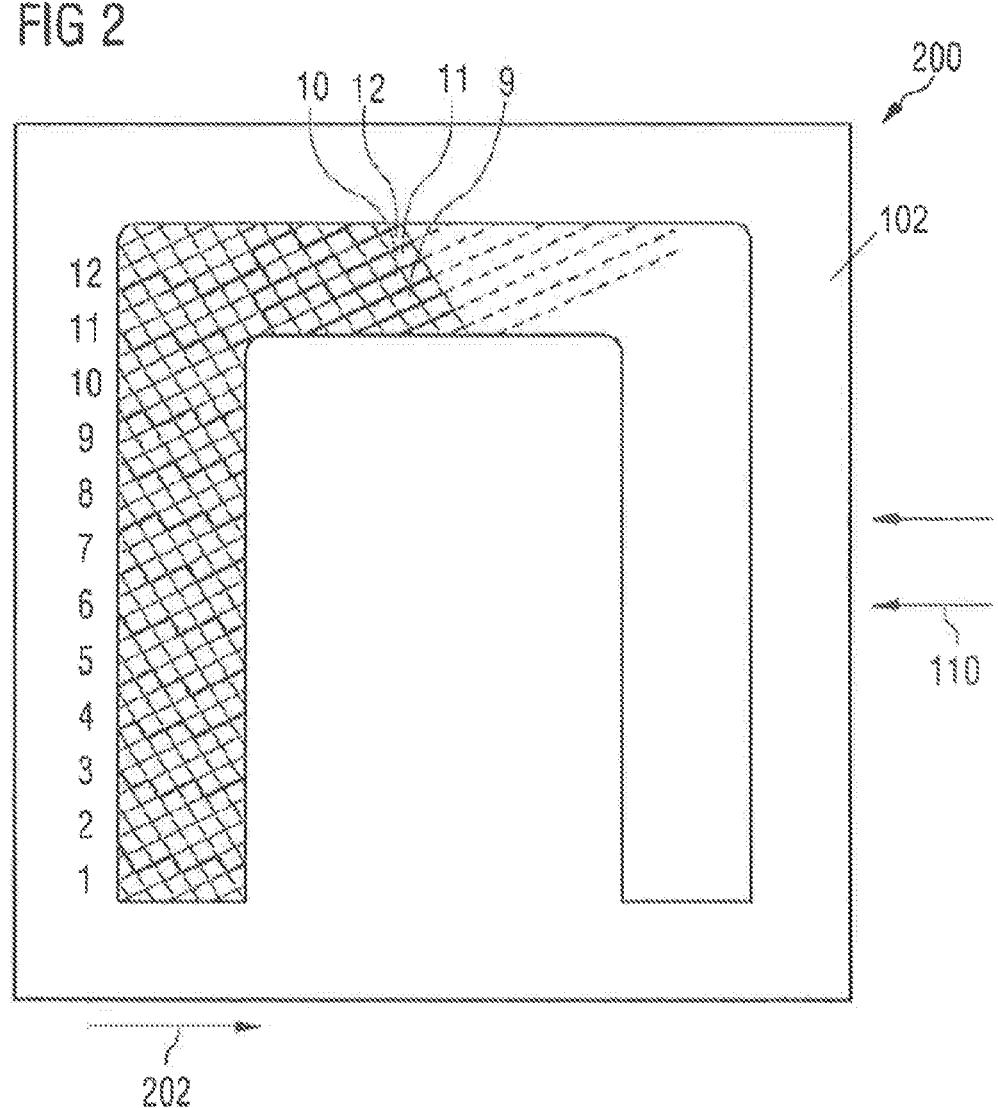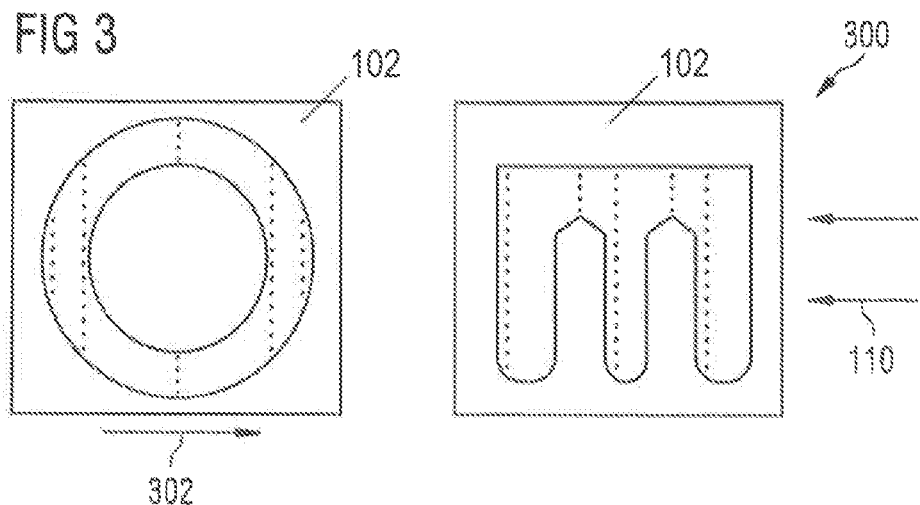

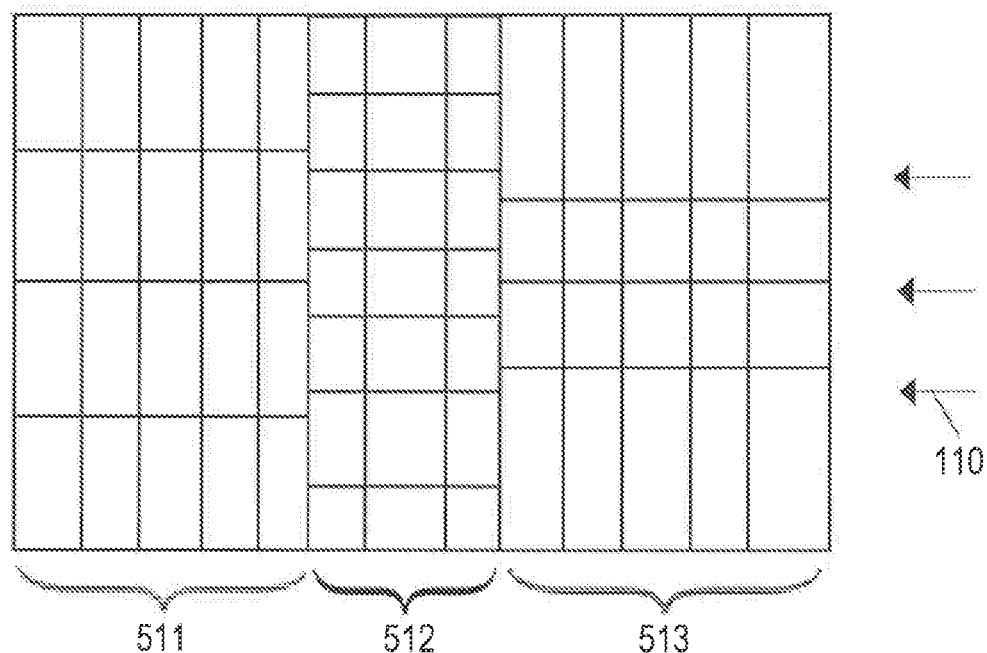
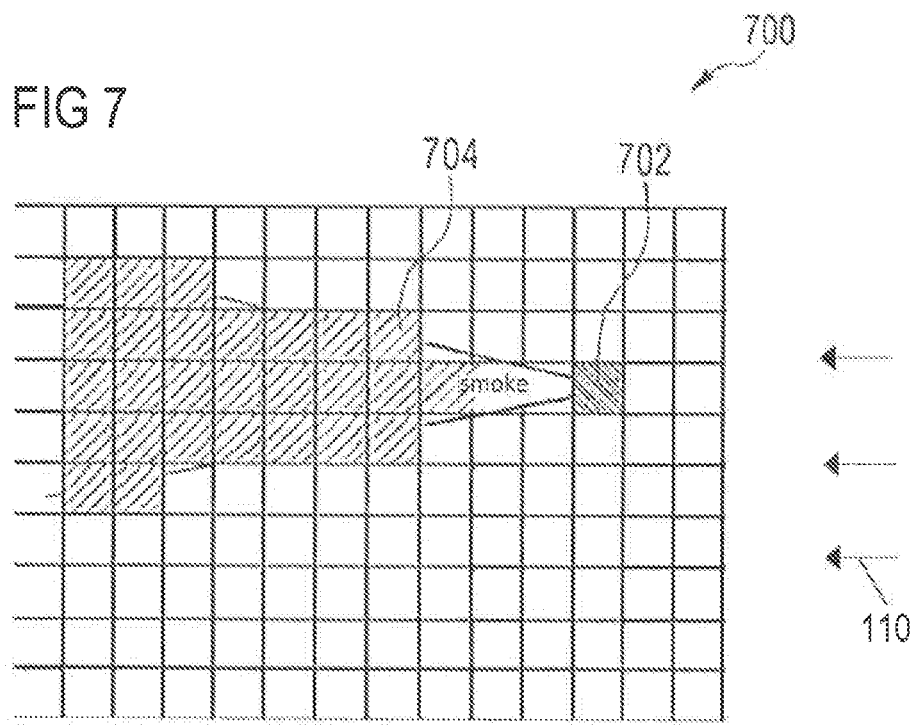

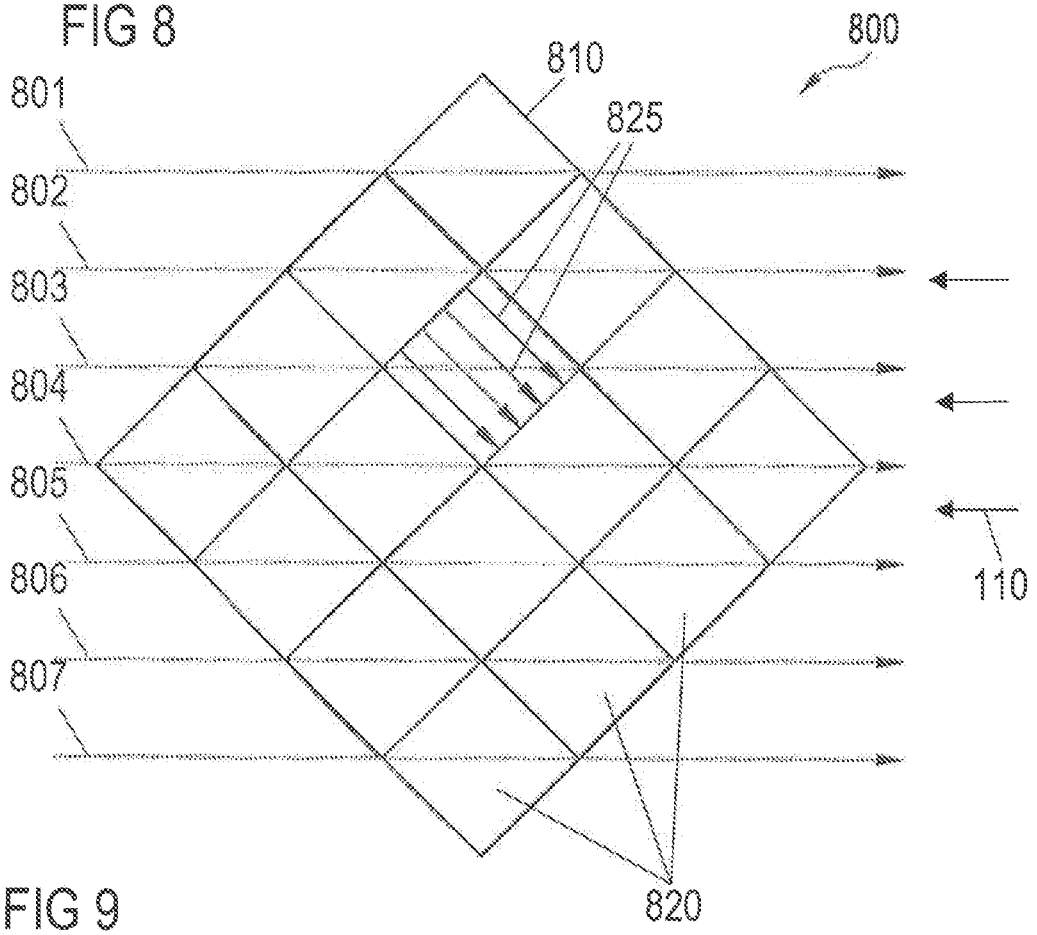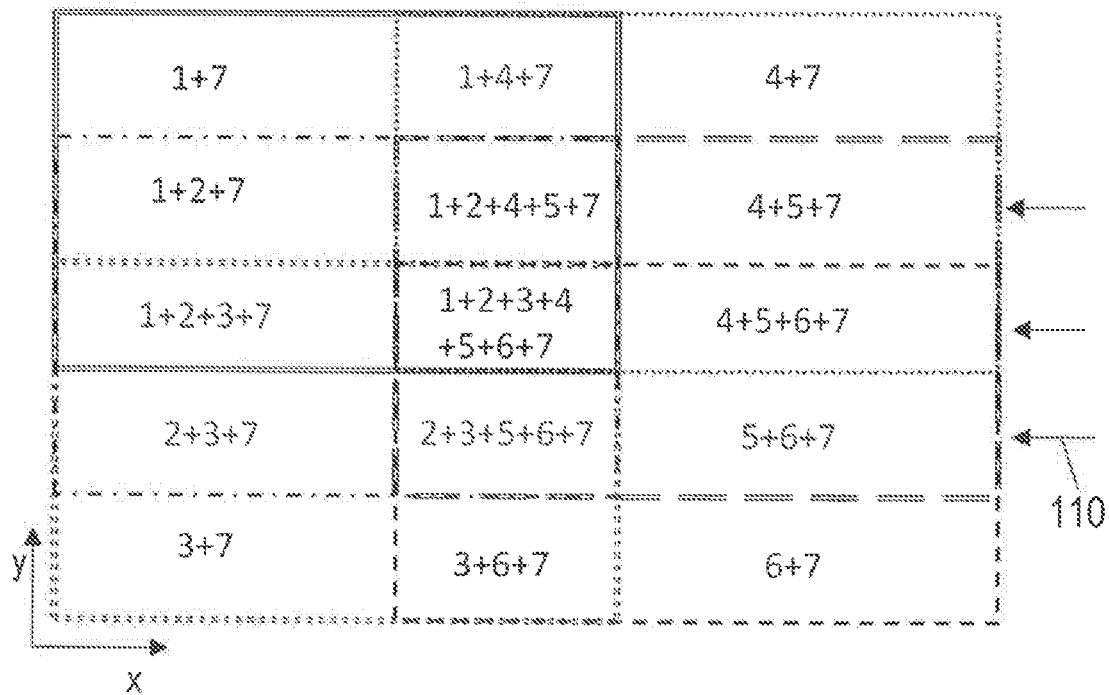

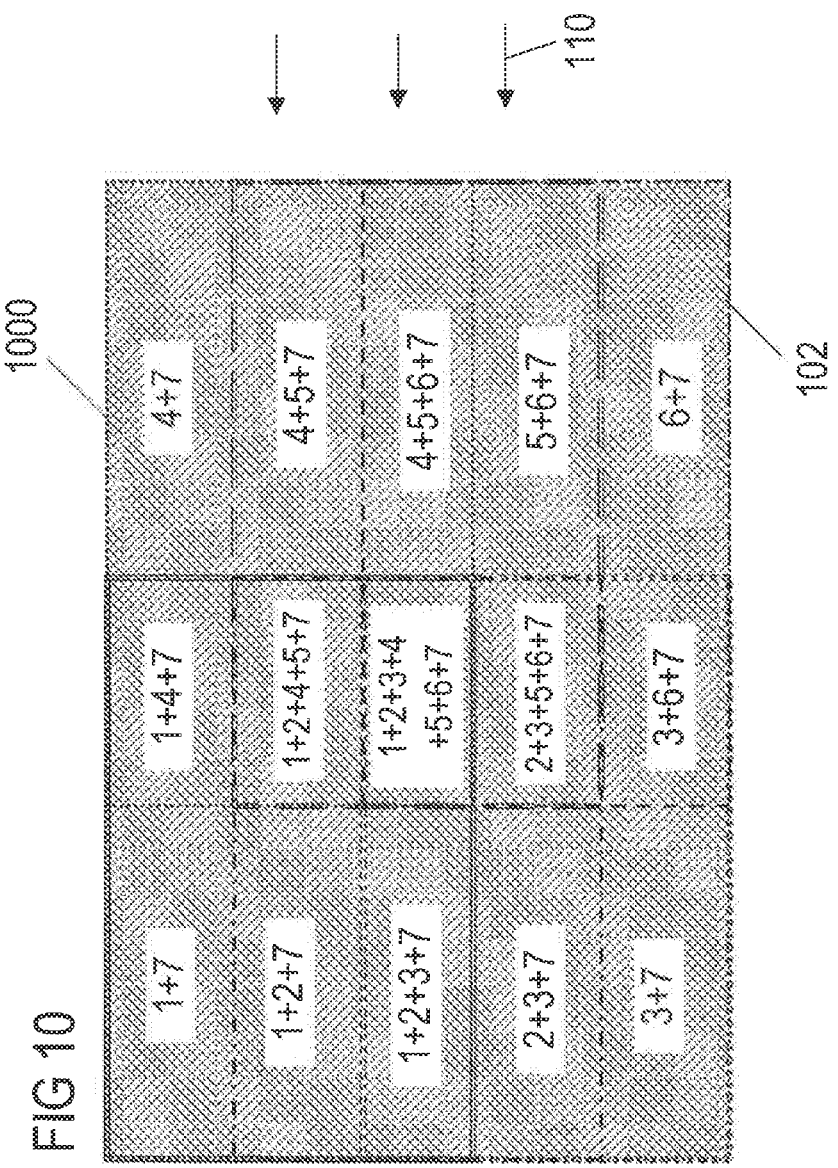

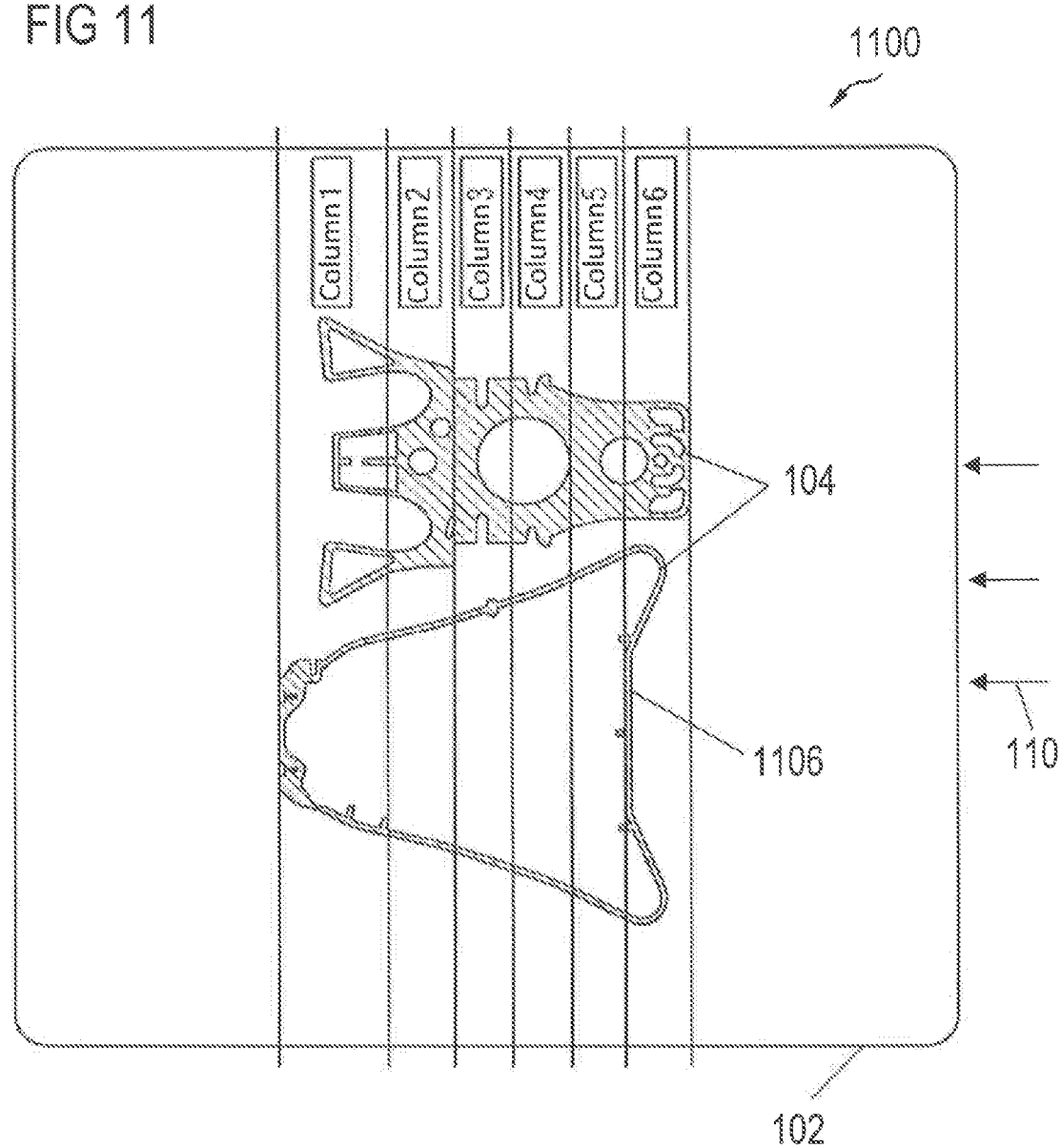

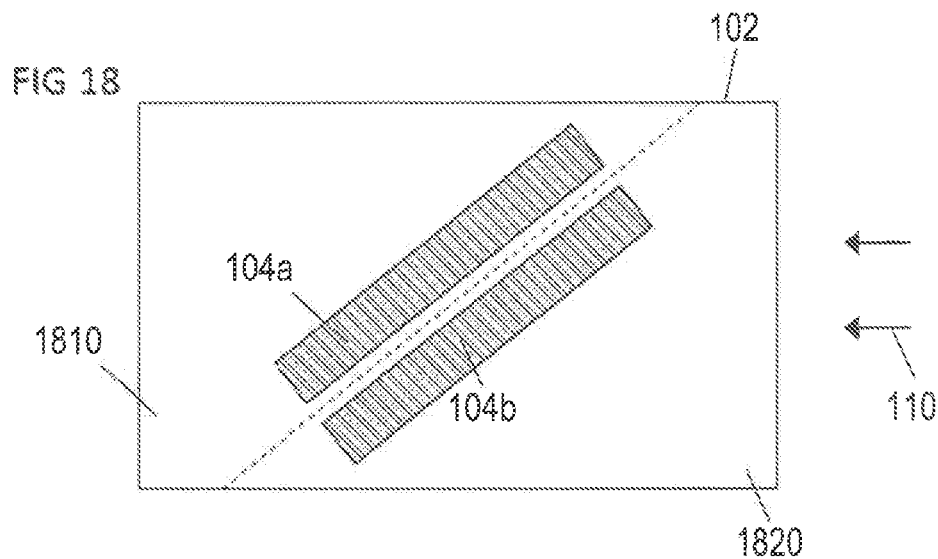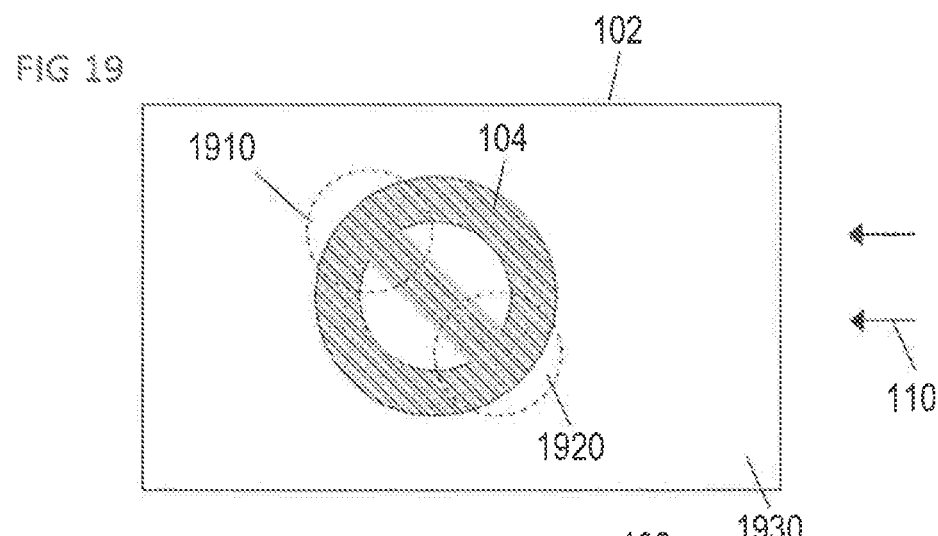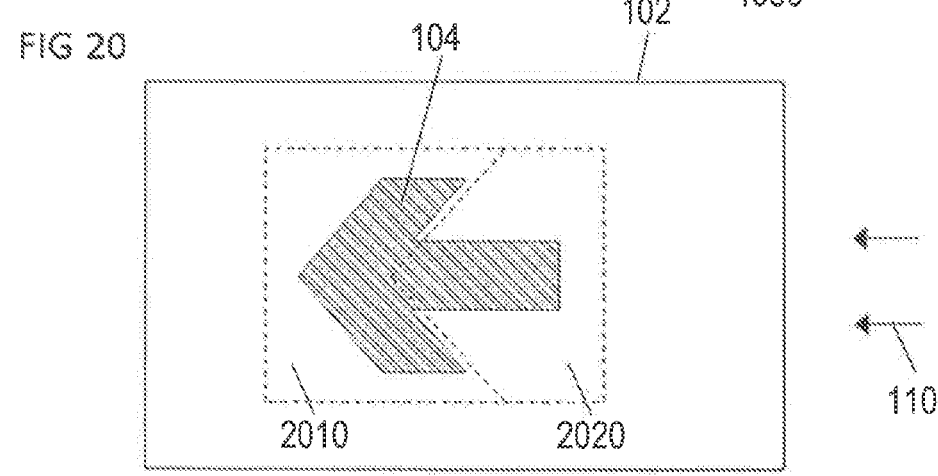

CONTROL METHOD, CONTROL DEVICE AND PRODUCTION APPARATUS

CROSS-REFERENCE TO RELATED APPLICATIONS

This application is the U.S. national phase of international application PCT/EP2020/055386, filed on Mar. 2, 2020, which claims the benefit of German application DE 10 2019 001 522.3 filed on Mar. 4, 2019; all of which are hereby incorporated herein in their entirety by reference.

The invention relates to a control method for controlling a multi-beam apparatus having one or more beam sources for producing a plurality of beams of a system for manufacturing a three-dimensional workpiece by means of an additive layer construction method. The invention further relates to a computer program, which can be loaded into a programmable control device, with a program code to execute at least a part of a control method according to the present invention when the computer program is executed on the control device. The invention further relates to a data carrier, which contains the computer program. The invention further relates to a control device for controlling a multi-beam apparatus having one or more beam sources for producing a plurality of beams of a system for manufacturing a three-dimensional workpiece by means of an additive layer construction method. The invention further relates to a production apparatus for manufacturing a three-dimensional workpiece by means of an additive layer construction method.

In additive methods for manufacturing three-dimensional workpieces and in particular in additive layer construction methods, it is known to apply a raw material powder in layers to a carder, which is height-adjustable vertically using a movement device, and to solidify it by site-specific irradiation, e.g. by melting or sintering, in order ultimately to obtain a workpiece of the desired shape. The irradiation can take place by means of electromagnetic radiation, in particular laser radiation, or particle radiation. Once a workpiece layer has solidified, the height-adjustable carrier is lowered vertically by one layer thickness and a new layer of unprocessed raw material powder is applied to the workpiece layer already produced. Known coater arrangements or powder application apparatuses can be used for this purpose. Renewed irradiation then takes place of the now uppermost and as yet unprocessed raw material powder layer. The workpiece is consequently built up successively layer by layer, each layer defining a cross-sectional area and/or a contour of the workpiece. It is further known in this connection to access CAD or comparable workpiece data to manufacture the workpieces substantially automatically.

Known apparatuses for manufacturing three-dimensional workpieces are described, for example, in EP 2 961 549 A1 and EP 2 878 402 A1.

Multi-beam systems are described inter alia in WO 2018/172080 A1.

The object of the invention is to provide a control method that improves the scan strategy of a multi-beam apparatus. In particular, the object of the invention is to provide a control method for controlling a multi-beam apparatus having one or more beam sources for producing a plurality of beams of a system for manufacturing a three-dimensional workpiece by means of an additive layer construction method, which control method achieves uniform utilisation of all beam sources or optics, avoids a collision of smoke trails with beams and prevents splash particles of the material to be solidified from also being melted.

This object is achieved by a control method, a control device and a production apparatus according to the independent claims. Preferred embodiments of these are described in the dependent claims.

The control method disclosed does not have to be used for every layer of the solidifiable material or of the component, but can rather be used on just a few (i.e. a predetermined number of) layers or even only on a single layer. In particular, if only (very) few and/or very small areas (i.e. areas with a predetermined maximum size) of material to be solidified are provided in the layer, such as in the case of extremely filigree component sections or in the case of support bodies, application of the method can be dispensed with. Application to individual layers is therefore understood as an application of the control method within the sense of the invention. The method is preferably used for all layers of the material to be solidified or of the component, however.

The present disclosure describes a control method for controlling a multi-beam apparatus with one or more beam sources for producing a plurality of beams of a system for manufacturing a three-dimensional workpiece by means of an additive layer construction method in which a solidifiable material for manufacturing the three-dimensional workpiece is applied in layers to a surface of a carrier and the solidifiable material in a respective layer is solidified by the plurality of beams at points of incidence of the plurality of beams on the solidifiable material, wherein the points of incidence of the beams for solidifying selective regions of one of the layers of the solidifiable material for manufacturing the three-dimensional workpiece are each controlled substantially against a gas flow direction of a gas flow over the surface of the carrier; wherein the control method comprises:

(a) dividing the material to be solidified in the respective layer into at least two sections, wherein two of the at least two sections extend in the gas flow direction of the gas flow prevailing over the two of the at least two sections at least partly in succession, (b) dividing at least one of the two of the at least two sections into at least two surface pieces, (c) assigning each of the surface pieces to precisely one specific beam, which solidifies the material to be solidified in the assigned surface piece, (d) controlling the points of incidence of the beams such that, at one point in time at least during an exposure of the material to be solidified, the material to be solidified is solidified in at least two surface pieces, and a network of straight lines running between each centre point of the points of incidence to every other centre point of the points of incidence at no point in time during the (current, for example during a predetermined time period) exposure, in which all centre points of the points of incidence are located outside of a predetermined distance (e.g. the non-interference distance, as defined below) from one another, has a straight line parallel to the gas flow direction of the gas flow prevailing over the two of the at least two sections.

Here the sections can have different shapes. In some embodiments, the sections comprise columns, which extend substantially perpendicular to the gas flow direction of the gas flow, i.e. the layer of the material to be solidified is divided into at least two columns, wherein the columns extend substantially perpendicular to the gas flow direction of the gas flow. The number and/or position and/or shape of the sections can be determined here by the optical configuration of the machine, for example by the number and/or processing regions of the beams for solidifying the material.

Alternatively or in addition, the number and/or position and/or shape of the sections can also be influenced by observation regions of one or more sensors and/or by position and/or shape and/or by a desired quality of the component geometry in the layer to be solidified or the vectors resulting therefrom, by means of which the beams for solidifying the material are guided over the material layer. The angular deflection of the scanner mirrors and/or the laser power introduced and/or an acceptable influencing by smoke cones and/or the position of merging regions of hatch vectors and/or build time optimisation, for example, can also be taken into consideration to this end. Such an orientation of the columns or sections extending substantially perpendicular to the gas flow direction of the gas flow is generally not necessarily needed, however, but can generally also have freeforms. It is additionally or alternatively possible for a section to encompass another section and/or for a section to be formed of a plurality of unconnected surfaces. The at least two sections are determined, however, in that seen from the gas flow direction, these at least partially undercut one another. Due to the undercut, a relationship results at least between two fields, which each lie in different sections, in respect of the influencing of the processing of one field by the smoke cone produced by processing of the other field.

The boundaries between two sections can have a certain tolerance range. This can serve in particular to avoid microvectors in a division of surface pieces based on a vector distribution on the component geometry. A surface piece can thus extend up to a certain extent (e.g. up to a predetermined maximum overlap length and/or up to a predetermined maximum surface size) into another section.

Inside of a distance termed a non-interference distance in this publication, the mutual influencing of two processing beams by their smoke and/or splashes to a certain extent is not exceeded. The non-interference distance can be implemented as a general dimension in the control or be determined for the specific construction application. The non-interference distance can be dependent on the component material and/or the laser power introduced (i.e. spot size and/or shape of the exposure point and/or laser power per area and/or wavelength and/or feed rate and/or angle of incidence between beam and powder surface) of the two laser beams and/or the desired component quality. When using a plurality of beams with different beam parameters, the non-interference distance for each beam combination relative to one another can be different. Two beams may also operate simultaneously in succession in the gas flow direction within this defined non-interference distance in some embodiments.

Extraction distance is used in this publication to define another distance that is relevant for the mutual influencing of the processing of two beams relative to one another. Extraction distance is understood as the distance over which splashes arising due to processing are at least conveyed away from the processing location by the gas flow before they come down again in the plane of the build field, i.e. before they land in the powder bed. This distance differs from the non-interference distance. While the non-interference distance takes account of influencing of the smoke and splashes arising in the beam path of the processing beam due to irradiation of the material to be solidified, i.e. above all a defocusing and/or blockade of the radiation, the extraction distance takes account of the influencing due to the splashes that have come down in the powder bed. This distance is dependent on the one hand on the splash tendency of the current processing, i.e. on the construction material and the parameters of the laser power introduced (spot size, laser power per area, wavelength, feed rate, angle of incidence between beam and powder surface), and on the other hand on the flow conditions of the gas flow prevailing at the processing site. The extraction distance can be stored as a globally uniform value or defined for each processing beam. Furthermore, it is also possible for the extraction distance to be determined separately depending on one or more of said parameters for each irradiation site on the material to be solidified. In the case of optimal gas guidance in the multi-beam apparatus, the extraction distance is infinite at all locations of the build field, i.e. all splashes are carried away by the gas flow such that no splashes come down on the build field. In some embodiments, however, the extraction distance is greater than the non-interference distance. Since at points of the build field splashes may potentially have come down in the gas flow direction outside of the extraction distance of points already processed, which splashes can influence the irradiation of the point and thus the component quality negatively, irradiation should preferably not take place there in some embodiments. The sequence of irradiation of the material to be solidified is accordingly to be controlled preferably so that the points of incidence of the beams in the gas flow direction are always guided within an extraction distance relative to points of the material to be solidified in the respective layer that have already been processed. It is particularly preferable, however, that the beams are controlled such that the points of incidence of the beams are generally only guided against the gas flow direction relative to points of the material to be solidified in the respective layer that have already been processed.

A beam source can be utilised in this case through optics (e.g. beam splitters) known to the expert to generate a plurality of beams. Alternatively, a beam is generated by a respective radiation source.

The respective points of incidence of the plurality of beams can be different, or at least partly identical and/or can overlap.

In some embodiments, before assignment of the surface pieces to precisely one specific beam, each of the surface pieces is assigned by its position relative to the surface of the carrier and/or to a gas flow outlet of the gas flow to one or more specific beams of the plurality of beams. A specific region can thus advantageously be irradiated only by one or more beams whose angle of incidence on encountering the material to be solidified lies in a specific angular range.

In some embodiments, the points of incidence of the beams are at least partially controlled continuously over the surface of the carrier.

In some embodiments, at least two of the centre points of the points of incidence are located outside of the predetermined distance from one another for at least a predetermined period. In some embodiments all centre points of the points of incidence are located outside of the predetermined distance from one another for at least the predetermined period. The layer can be irradiated efficiently hereby at various regions.

In some embodiments, a position and/or an extension of the sections on the surface of the carrier and/or a number of sections are defined based an extension and/or position of the three-dimensional workpiece in the layer of the solidifiable material, and/or a position of scan fields of the beams, which are configured via points of perpendicular beam incidences and an extension with reference to the surface of the carrier and/or an angle to the axis of the respective perpendicular beam incidence. The efficiency of manufacturing the three-dimensional workpiece in particular can advantageously be increased hereby and a specific region irradiated only by one or more beams whose angles of incidence lie in a specific angular range on encountering the material to be solidified.

In some embodiments, all sections in a direction perpendicular to the gas flow direction of the gas flow with the same extension are defined. Alternatively or in addition, all sections in the gas flow direction of the gas flow with the same extension are defined. The efficiency of manufacturing the three-dimensional workpiece can be increased by this uniform distribution, as in particular a uniform distribution can be guaranteed when assigning sections to specific beams.

In some embodiments, the exposure of each surface piece in a second section, which extends in the gas flow direction at least partly before another first section, is only begun after the material to be solidified of ail surface pieces of the first section has been fully irradiated. It can be advantageously guaranteed hereby that the exposure so of the second section has no effects on the material that was already exposed in the first section. The quality of the three-dimensional workpiece can be increased hereby.

In some embodiments, each point of incidence is controlled such that this is not as located in the gas flow direction outside of an extraction distance from a point at which the material to be solidified of the respective layer was already irradiated. It can be guaranteed hereby that splashes arising during exposure of a specific region only land in another region that was already exposed. It is thus brought about that splashes in a specific layer are not exposed. The quality of the three-dimensional workpiece can thus be increased.

In some embodiments, the number of surface pieces into which the corresponding section is divided is defined based on an extension of the section perpendicular to the gas flow direction of the gas flow and/or a position of the section in the layer of solidifiable material. Thus fewer beams can be used e.g. in narrow component regions of the three-dimensional workpiece to be manufactured and the corresponding section or sections can be divided between fewer beams.

In some embodiments, a number of surface pieces in a section is defined by a number of beams maximally exposing at the same time in the section or a multiple thereof. The efficiency of manufacturing of the three-dimensional workpiece can be increased hereby, especially as all beams are used simultaneously to expose the material to be solidified.

In some embodiments, the surface pieces in a section are divided substantially into surface pieces of the same size. In some embodiments, each column is divided in this case into equidistant pieces corresponding to the number of beams or into surface pieces of equal size. The vectors in each of these pieces can be assigned to the corresponding beam. A uniform utilisation of the beams can be achieved thereby.

In some embodiments, the predetermined number of surface pieces of each of the sections corresponds to a number of the plurality of beams.

In some embodiments, each of the surface pieces, which is associated with a specific beam of the plurality of beams, is divided into a plurality of irradiation fields based on a beam diameter and/or its maximum deflection angle of the specific beam. This leads to a particularly uniform utilisation of the beams and can be used in particular in manufacturing systems with optical configurations that have an expansion of a beam diameter, for example with zoom optics.

In some embodiments, a closed contour train for producing a contour of the three-dimensional workpiece is assigned to one or more beams, in particular to only one beam, independently of the position of the contour train in the surface pieces. In particular, a closed contour train for producing a contour of the three-dimensional workpiece can be assigned to a single beam. A good surface quality of the three-dimensional workpiece can be ensured hereby (due to no visible overlap where possible). Contour trains can be classified as separate surface pieces, which can then be dearly distinguished from the predominantly prevailing grid. Contour trains can preferably be processed independently of a grid overlaying the build field, however, i.e. the assignment of contour trains to a beam can take place independently of the assignment of surface pieces of a grid to different processing beams. Furthermore, the surface pieces themselves are assigned to the processing beams according to an applied scan strategy. Influencing arising due to the positional relationships of the surface pieces with one another and a processing sequence resulting from this can nevertheless be retained, however, for processing of the contour trains and surface pieces. In the sense of the invention, an area whose area content without the shares of contour trains is assigned to a first processing beam, and through which one or more contour trains run that are assigned to one or more other processing beams, is understood as being assigned only to the first processing beam.

In some embodiments, the material to be solidified in the respective layer is divided into the surface pieces by means of a grid or a superimposition of several grids. When assigning vectors of a layer to a scan system within the manufacturing system for manufacturing the three-dimensional workpiece, a compromise must be achieved between optimisation in respect of the build time and the component quality. Due to the grid or the superimposition of several grids, a uniform distribution of vectors, in particular of hatch vectors, can be brought about over all available optics with synchronised scan progression against the gas flow direction and taking interactions with the smoke into consideration. Alternatively or in addition, when assigning or dividing the vectors between the different beams (or beam sources), the number of vectors can be taken into consideration. This assignment can be selected so that the quality of the three-dimensional object to be manufactured is optimised. In some embodiments, the division of the material to be solidified of the layer is thus based on a number and/or length of vectors that are assigned to the respective beams, wherein the vectors define a scanning process of the layer by the beams. Alternatively or in addition, the division can also be based on an exposure time of the respective beams. In a division of the vectors between processing beams and/or an assignment of surface pieces of a grid to processing beams, a position of the scan fields of the scan systems relative to the build field can preferably be taken into account such that the processing beams do not cross (or never cross at least for a predetermined time span).

In some embodiments, the division of the material to be solidified of the layer is based on an exposure time assigned, in particular substantially distributed uniformly, to the respective beams. Due to increased efficiency of production of the three-dimensional workpiece, the overall exposure time can be reduced.

In some embodiments, a first grid divides the layer into regions, which are each reached by single or multiple beams. The regions are configured via points of perpendicular beam incidences and an extension with reference to the surface of the carrier and/or an angle to the axis of the perpendicular beam incidence.

In some embodiments, a second grid divides the material to be solidified in the respective layer according to a vector orientation of vectors (e.g. hatch vectors) of the beams (for hatch vectors in a hatch pattern based on a hatch distance and a hatch rotation of the hatch pattern), the vectors defining a progression of the beams (on the surface of the carrier). Vector blocks can be retained here, wherein (hatch) vectors are not split and no microvectorisation takes place, In some embodiments, a region in which the vectors (e.g. hatch vectors) merge (i.e. adjoin one another in the vector direction) is not divided into different sections assigned to different beams. The merging of fields can be taken into account. In particular, the vector orientation of the vectors in adjoining surface pieces can be defined such that vectors at the surface boundaries do not run towards one another. Vectors whose respective ends point towards one another and which have the same x-y coordinates are thus not scanned at the same time by different beams. Overheating and undesirable material vaporisation can be avoided at this position or in this local region, so that it can be prevented that pores are created on account of a deep weld effect. Specifically a merging region is thus preferably assigned to only one beam, so that simultaneous processing of two vectors coming together is excluded. It is particularly preferable if converging vectors are brought together so that the merging region is eliminated.

In some embodiments, the sections are designed as columns running substantially perpendicular to the gas flow direction of the gas flow, an extension of the respective column parallel to the gas flow direction of the gas flow being defined such that each of the columns has the same number and/or the same length of processing vectors and/or the same computational exposure time of the beams. The scan surface distribution can be utilised globally in this case to classify the scan progression.

In some embodiments, at least one section is divided into surface pieces so that an identical number of beams usable for the material to be solidified in each surface piece for exposing the surface piece and/or a substantially identical number of vectors (e.g. hatch vectors) In each surface piece and/or a substantially identical sum of the length of the vectors in each surface piece and/or a substantially identical exposure time in each surface piece is achieved. Information can exist for each surface piece in respect of the usable optics or beams for exposing the respective surface piece, the number of (hatch) vectors and a length of the (hatch) vectors in each surface piece.

In some embodiments, an identical number and/or total length of vectors (e.g. hatch vectors) and/or an identical exposure time and/or an identical number of surface pieces is assigned in at least one section to each of the beams to which at least one surface piece was assigned in the section. A uniform scan progression and/or optimisation (In the best case an approximate uniform distribution) of the scan time can be guaranteed hereby.

In the case of lattice structures, the division in some embodiments can be undertaken based on the overall marking duration and/or the overall marking length and/or the overall marking number.

In some embodiments, the control method further comprises determination, based on irradiation of the material to be solidified in the layer in a first surface piece using one of the beams, of a region with reference to the surface of the carrier in which an occurrence of smoke and/or splashes arising due to the irradiation in the first surface piece is expected, and determination, based on the region in which the occurrence of smoke and/or of splashes is expected, of whether a second surface piece can be irradiated by the beam or by another beam. The duration of production of the three-dimensional workpiece can thus be reduced, wherein it is guaranteed that a beam does not collide with the smoke and that no splash caused by a first beam is melted by another beam.

It can readily be seen that in the sense of the invention the entire control method does not have to be carried out on a control device integrated into a multi-beam apparatus, but rather it can also be executed only partially on this. In particular, it is possible that parts of the control method can be carried out on a conventional PC workstation, for example. The instructions resulting therefrom for the multi-beam apparatus can then be transferred, for example by means of a network connection or a data carrier, to the multi-beam apparatus.

In some embodiments, the beams comprise laser beams, wherein in particular all beams are laser beams. In particular, the one radiation source or the plurality of radiation sources comprise a laser. In particular, all laser beams have a substantially identical wavelength and/or a substantially identical power and/or a uniform, in particular punctiform, form of the point of incidence. In some embodiments, the beams comprise at least two laser beams, which have a different wavelength and/or a different power and/or a different form of the point of incidence.

The laser beams can be identical or different, i.e. at least two laser beams can have a different wavelength and/or a different power and/or a different irradiation area and/or a different geometry of the irradiation area, for example. The differences can be achieved by different beam-forming optics in the beam path of the respective beams and/or at least individual beam properties can be achieved by different laser beam sources, thus solid-state lasers (disc, bar or fibre lasers), diode lasers or gas lasers, for example, can be used.

Furthermore, a computer program is described that can be loaded into a programmable control device, with a program code, in order to execute at least a part (e.g. completely) of a control method according to the present description when the computer program is executed on the control device.

The present disclosure further comprises a data carrier containing the computer program, the data carrier comprising an electrical signal, an optical signal, a radio signal or computer-readable storage medium.

The present disclosure further comprises a control device for controlling a multi-beam apparatus having one or more beam sources for producing a plurality of beams of a system for manufacturing a three-dimensional workpiece by means of an additive layer construction method, the control device comprising: one or more processors; and a memory containing instructions, which can be executed by the one or more processors, whereby the control device can be operated to carry out at least the control of the points of incidence of the beams according to d) (see above) (or completely) the method according to the embodiments described herein.

The present disclosure further comprises a production apparatus for manufacturing a three-dimensional workpiece by means of an additive layer construction method, the production apparatus comprising: a multi-beam apparatus having one or more beam sources for producing a plurality of beams; and the control device according to the embodiments described herein.

If a beam source is used, the plurality of beams can be produced by optics known to the expert, such as beam splitters, for example.

On account of their positional relationships with one another, the terms build field, surface of the solidifiable material or material to be solidified, material layer, component or component layer, carrier and powder bed are used synonymously with respect to division. It is easily understood that a division of one of said objects also causes an analogue division of the other. Thus when speaking of the build field, the material layer located in the build field or its surface, or the component to be built there is also meant.

The invention is explained below in greater detail with reference to the enclosed schematic figures, of which FIG. 1 shows a schematic diagram of a scan strategy for scanning a layer for manufacturing a three-dimensional workpiece by means of an additive layer construction method, FIG. 2 shows a schematic diagram of another scan strategy for scanning a layer for manufacturing a three-dimensional workpiece by means of an additive layer construction method, FIG. 3 shows schematic diagrams of component geometries, FIG. 4 shows a schematic diagram of a positional relationship between the build field and scan fields of an exemplary optical configuration, FIG. 5 shows a schematic diagram of an exemplary division of a carrier plate, FIG. 6 shows a schematic diagram of another exemplary division of a carrier plate, FIG. 7 shows a schematic diagram of another scan strategy, FIG. 8 shows a schematic diagram of another scan strategy, FIG. 9 shows a schematic diagram of a division of a layer, FIG. 10 shows a schematic diagram of a division of a layer according to FIG. 9, FIG. 11 shows a schematic diagram of another division of a layer, FIG. 12 shows a schematic diagram of a smoke cone and its relationship to a division of a layer, FIG. 13 shows a schematic diagram of another scan strategy, FIG. 14 shows a flow chart of a control method, FIG. 15 shows a schematic diagram of a production apparatus, FIG. 16 shows a schematic diagram of an interaction of a laser with a smoke trail of another laser outside of a non-interference distance, FIG. 17 shows a schematic diagram of an interaction of a laser with a smoke trail of another laser within a non-interference distance, FIG. 18 shows a schematic diagram of another division of a layer, FIG. 19 shows a schematic diagram of another division of a layer, FIG. 20 shows a schematic diagram of another division of a layer, FIG. 21 shows a schematic diagram of a division of a layer with a gas flow running radially outwards from the centre of the build field, and FIG. 22 shows a schematic diagram of a processing point with the non interference distance and extraction distance resulting from the position.

The present invention relates in particular to a scan strategy for a multi-beam apparatus, in particular for a multilaser selective laser melting machine.

It is achieved with the embodiments described herein that a smoke trail of a processing spot does not get into another beam (e.g. laser beam) (or conversely that a beam (e.g. laser beam) is not controlled into a smoke trail produced by another beam).

In some embodiments, the machine comprises e.g. 7, 12, 15 or more lasers, wherein any other number of lasers can be used.

Some embodiments consist of a strategy of how these scan vectors can be divided between the different optics (e.g. laser beams) of a multi-beam machine (e.g. multi-laser machine).

The description of lasers or laser sources in the present disclosure relates equally to other beam sources such as particle sources (e.g. electron beam sources). All embodiments disclosed in the present description are thus not necessarily restricted to lasers or laser sources.

The objectives of dividing the scan vectors between different optics are thus, among other things, a uniform utilisation of all lasers and prevention of a collision of smoke trails with laser beams and prevention of melting of splash particles (based on exposure against the gas flow), wherein waiting times can arise between irradiation of different regions. A minimum and maximum distance between the beams can be achieved by the embodiments described. In some embodiments, different exposure times are achieved despite an identical number of vectors per beam, so that following processing of a column of the width x and the length y, which is captured by the beams, a signal must be awaited that the last vector in this column was exposed. Only then is exposure of the next column continued in some examples. The maximum distance between adjacent beams is limited hereby and it may be necessary for the vectors to be written to a data register in the form of a column division.

When assigning vectors of a layer (slice) to a scan system within e.g. a selective laser melting system, a compromise must be achieved between optimisation with respect to build time and with respect to component quality.

The embodiments described herein permit a time- and quality-optimised division of scan vectors between various scan systems in a selective laser melting system. In some embodiments, a superimposition of different lattices is used for this purpose to divide a layer into fields, which can then be assigned to one optics with the idea of uniform distribution across all optics. A uniform progression against the gas flow direction can be guaranteed here at the same time, however. The opportunity is offered hereby to achieve time optimisation in not ideally distributed manufacturing processes by prioritising regions lying closer to the inflow of gas, wherein the quality of the workpiece is not negatively influenced (in particular by taking smoke cones into consideration).

Quality-optimised assignment of regions of the layer to be solidified and the optics is aspired to for the contours of the workpiece to be manufactured. Here the optical regions can be limited on account of the areas, for example, in order to be able to optimise the quality of the workpiece in these regions with regard to the deflection angle of the beam of the respective optics. Alternatively or in addition, closed contour trains can be assigned to as few optics as possible. To this end it is possible for the assignment of the contour trains to the processing beams to consider these independently of the arrangement of the sections and surface pieces and only call on the surface arrangement for determining the processing sequence of the surface pieces and contour trains. This ensures a good surface quality (no visible overlap if possible).

For the hatches, a speed-optimised assignment is aspired to, taking account of the uniform scan progression of all optics against the gas flow direction and avoiding interactions of smoke cones of an optics and regions that are still to be exposed.

FIG. 1 shows a schematic diagram 100 of a scan strategy for scanning a layer for manufacturing a three-dimensional workpiece by means of an additive layer construction method.

The diagram shows a build field 102 lying in the build plane, a component 104, laser spots 106, a smoke cone 108, the direction of the gas flow 110 and the direction 112 in which the processing proceeds.

A machine configuration is assumed here by way of example in which seven laser beams or exposure points 106 can be directed by means of seven scanner optics onto the build field 102, wherein each scanner optics can be directed onto each point of the build field 102, i.e. the scan fields of the scanner optics overlap completely.

The exposure points, here laser spots 106, are controlled such that they are always arranged approximately in a line that lies in the build plane (x,y) perpendicular to the gas flow direction.

The processing proceeds from left to right, i.e. opposite to the gas flow.

As depicted in FIG. 1, the component layer (or the build field in the case of several components) is divided in the x-direction into a suitable number of columns or sections (in this example numbered by columns 143). The columns do not necessarily have to be linear but can be limited e.g. along chessboard squares (vector blocks), which can be rotated about an angle to the columns depicted.

In addition, a minimum distance and/or a maximum distance can be defined between two laser spots in the algorithm, so that in the case of narrow component regions as in FIG. 1 in the right-hand part of the component, not all (in this example 7) lasers are used but the sections are divided only between a smaller number of lasers (e.g. 5 lasers). This can be advantageous for avoiding too great an influence of splashing onto the adjacent laser and for preventing local overheating due to the use of several lasers in a narrow local region.

Each column is divided into equidistant surface pieces corresponding to the number of lasers. Surface pieces of identical size are understood here as equidistant surface pieces. In each of these surface pieces, the vectors are assigned to the corresponding laser.

The column width can be selected in advance as a fixed value, for example, or also selected depending on an available hatch pattern, which is present as fields with hatch vectors, for example. In particular, the column width can be selected such that in the columns a division into fields (according to the number of beam sources) takes place, the number of vectors and/or the vector length and/or the exposure time of which is distributed approximately uniformly. Furthermore, the column width can be selected also depending on a minimal and/or maximal distance between two laser spots.

This scan strategy makes a very simple division of the component layer possible regardless of the component geometry and can also be calculated in a short time even with low computing capacity. On account of processing in columns, the influencing of a laser spot 104 by a smoke cone 108 of another laser spot is effectively avoided. Depending on the component geometry, however, more processing time is required in comparison with other strategies.

FIG. 2 shows another scan strategy 200 by way of example, in which the gas flow direction of the gas flow 110 and the direction 202 of the processing sequence of the chessboard squares for each of the lasers is depicted.

A machine configuration is assumed here, for example, in which twelve laser beams can be directed by means of twelve scanner optics onto the build field 102, wherein each scanner optics can be directed onto a line of the build field 102 extending over the entire width of the build field 102 in the processing direction 202. The extension of the line perpendicular to the processing direction 202 is implemented so that the scan fields of the scanner optics overlap at least partly.

By assigning the surface pieces to the corresponding lasers according to the chessboard pattern, a uniform utilisation of the lasers is achieved. To this end the number of surface pieces lying in the component layer in a line perpendicular to the processing direction 202 is divided by the number of scan fields of the scanner optics lying in this region, i.e. by the number of laser beams that can be used, and assigned to the laser beams.

FIG. 3 shows a schematic diagram of component geometries 300. The gas flow direction of the gas flow 110 and the direction 302 of the exposure against the gas flow are shown.

The machine configuration assumed can comprise fifteen or more scanner optics, for example, wherein each scanner optics can be directed onto a line of the build field 102 extending across the entire width of the build field 102 in processing direction 302. The extension of the line perpendicular to the processing direction 202 is implemented so that the scan fields of the scanner optics overlap at least partly. Alternatively, however, so many beams can be provided that the laser spots only have to be guided with a parallel feed over the build field in the processing direction 302, to this end even a plurality of beams can be directed by means of a common optics. Nor do the laser spots have to have a round geometry, but can also have an oval, rectangular or polygonal geometry, for example. The one or more optics do not necessarily have to be scanner optics; they can also be one or more movable processing optics.

The laser spots in this example are always arranged approximately in a row perpendicular to the gas flow direction.

The points in the diagram in FIG. 3 thus represent the laser spots or melting bands at different times in processing direction 302.

The strategy even functions accordingly when a plurality of components is arranged on the platform.

FIG. 4 shows a schematic diagram of the relationships of an exemplary optical configuration with seven scanner optics for the build field 102. The points 401-407 show the positions of the laser beams with a perpendicular beam incidence onto the build field 102 of the respective scanner optics, i.e. the so-called optics centre points. The field 411 represents the scan field of the optics belonging to point 401, the field 416 represents the scan field of the optics belonging to point 406. The scan fields of the optics belonging to points 402-405 are not shown for reasons of clarity, but are analogous in size to the fields 411 and 416. The scan field of the optics belonging to point 407 covers the entire build field 102.

FIG. 5 shows a schematic diagram of an exemplary division 500 of the build field, i.e. a carrier plate or the layer of the material to be solidified that is applied to the carrier surface, for a machine with an optical configuration corresponding to FIG. 4.

The basic idea here is that the manufacturing platform in this example is divided completely into three global columns 511-513, which result from the overlap regions of the scan fields of the optical configuration. Each column is then divided in this example into several rows. Each row is then assigned to a specific optics. In this example, the first column 511 and the third column 513 are divided into four rows, and the second column 512 is divided into seven rows, based on the number of optics that reach the respective column.

In this example, the positions of the row and column boundaries are retained. Processing is carried out in columns in processing direction 502 against the gas flow. Processing of the following column is only commenced once the current column has been completely processed.

One advantage of this scan strategy is that it is easy to implement. The problems based on the smoke/smoke cones and splashing arising can be solved by this scan strategy. Vector blocks can be defined accordingly in a scan file.

In this scan strategy, some optics are not used in some examples, while others are used at the same time for solidifying the material of the layer.

A division of the layer is possible with this scan strategy. The processing direction against the gas flow direction can be taken into account in this case.

FIG. 6 shows a schematic diagram of another scan strategy 600, which is based on the division from FIG. 5.

In this scan strategy, an optimal position of the boundary of a row is calculated for each column based on optimisation of a hatch distribution. Here an approximate uniform distribution of the number and/or length of the hatch vectors can be aspired to in particular. The position of the boundaries of the row is no longer fixed in this example, individual rows can be made wider than other rows. This is depicted in the figure in the third main column 513 in which the two inner rows are much narrower than the outer rows, because for example a component geometry that is not depicted is limited in the third main column 513 of the component layer to be processed to a region in the centre of the column. The manufacturing speed of the workpiece can be optimised in this way.

In this example, each of the three main columns 511-513 corresponding to FIG. 5 are subdivided into additional sub-columns. The processing of a following column is only commenced when all the rows contained in the column have been completely processed. The behaviour with respect to the smoke cone and the splashes can be improved hereby. It is not possible for a laser beam to advance faster in a row to such an extent that impairment can occur due to its smoke cone. Due to the column size, a defined maximum distance between two adjacent laser spots is compulsorily maintained. A column width equal to the maximum distance, for example, can be selected for this purpose.

To prevent microvectors, reaching of one segment into an adjacent lattice cell can be permitted. The minimal cell size is defined in this case and depends on the width of a column or of the chessboard surface piece (maximum length of a hatch vector).

Irradiation of the columns takes place in a synchronised manner. All rows in a column can be irradiated e.g. simultaneously in this case. The irradiation of the next column is commenced when the previous column has been irradiated by all optics or scanners. The problems that can be caused by smoke cones or splashes generated by a laser beam moving forward are solved or circumvented hereby, the manufacturing time of the workpiece being lengthened if need be by additional waiting times.

FIG. 6 also shows that the row boundaries in the third main column 513 are displaced more towards the centre, because e.g. the component to be generated in the third main column has more surface to be generated than in the edge region. In principle a change in row distribution can also be permitted not only on transiting of the main columns but also from sub-column to sub-column. In particular, the sub-columns can themselves also be regarded as sections.

FIG. 7 shows a schematic diagram of another scan strategy 700.

To improve the manufacturing rate or manufacturing speed, all cells in a row are irradiated in this exemplary scan strategy successively and independently of cells in the same column. To be able to better solve the problems that can be caused by the smoke cone or the splashes, however, it is checked for each cell whether the irradiation of this cell is not blocked by other cells. This leads to an increased manufacturing rate, the aforesaid problems being solved or taken into account.

In this example, irradiation of the cell 702 is potentially blocked by the cells 704, as irradiation of the cell 702 would result in a smoke cone, which would negatively influence the component quality in a simultaneous irradiation of the cells 704. The definition of which cells would be negatively influenced by the smoke cone in simultaneous irradiation is dependent on parameters such as the component material, the laser power introduced (i.e. spot size, laser power per area, deflection speed) as well as the desired component quality. Cell 702 can thus not be irradiated before the component geometries to be built that are located in cells 704 have been irradiated.

FIG. 8 shows a schematic diagram of another scan strategy 800.

In this exemplary scan strategy, the grid is further defined.

In the exemplary scan strategies described above, the grid was oriented to the axes. Depending on the grid size, this can lead to many separate vector blocks.

In the scan strategy 800, the grid is not oriented to the axes but a cell grid 810 is used that is oriented to a hatch pattern, the fields 820 of which lie rotated by 45° to the axes in the example and contain the hatch vectors 825. Fewer sectionings arise hereby for the same grid size and fewer cells are defined overall, which increases the build capacity for manufacturing the workpiece.

In some embodiments, the grid forms a right angle with the direction of the hatch segments or divides the build field into square fields 820.

Due to this scan strategy the space can be used better for the vector blocks, as fewer sectionings are defined.

In some embodiments, the scan field division takes place such that a multilattice oriented to the hatch rotation is used for uniform distribution of hatch vectors over all available optics with a synchronised scan progression against the gas flow direction 110 and taking account of interactions with the smoke. In FIG. 8 the arrows 801 to 807 show seven rows of optics, i.e. the processing directions of seven processing beams operating adjacent to one another.

The grid in FIG. 8 is chosen so that—with a column definition which contains one field respectively in each of the optics rows 801-807 per column—the fields 820 undercut one another from the viewpoint of the gas flow direction 110. When all processing beams are directed simultaneously onto the build field, it can thus occur that two beams operate simultaneously in succession in the gas flow direction. This can be accepted with a sufficiently low distance from one another without a serious impairment of the component quality arising, see the implementations for FIG. 17 for this. The maximum distance up to which mutual influencing does not exceed a specific dimension is termed non-interference distance herein. The non-interference distance can be dependent on the component material and/or the laser power introduced (i.e. spot size, laser power per area, deflection speed) of the two laser beams and/or the desired component quality. When using a plurality of beams with different beam parameters, the non-interference distance can be different for each beam combination relative to one another. Since two beams may therefore operate in this defined non-interference distance in succession even in the gas flow direction, two points of incidence of the beams located within a non-interference distance from one another are treated as one point with the position of their centre point for checking the curve relationship that a curve drawn through the points of incidence at no time has a tangent that runs parallel to the gas flow direction.

FIG. 9 shows a schematic diagram of a subdivision of a layer or of the build field.

A grid 900 is defined here, wherein maximally attainable regions of the respective optics according to the optical configuration from FIG. 4 via the point of a perpendicular beam incidence of a beam and its extension in the x- and y-direction are taken into account.

In this example, fields are depicted including their assignment to the optics reaching this field.

FIG. 10 shows a schematic diagram of a further division of a layer or of the build field 102 building on the grid from FIG. 9.

The grid 1000 is based on a superimposition of the grid in FIG. 9 with a further grid, which is defined according to the vector orientation taking dynamic account of the hatch rotation per layer. The grid results from the hatch distance and the hatch rotation.

Vector blocks are retained in this case. Hatch vectors are not split up and no microvectorisation takes place.

Merged hatch vectors can be depicted here undivided taken into account by a merging of fields.

A correction of the vector direction in merged hatch vector blocks can be carried out in some embodiments. Vectors with their respective ends pointing towards one another and having the same x-y coordinates are not scanned by different beams at the same time. Overheating and undesirable material evaporation can be avoided at this position or in this local region, so that the creation of pores on account of a deep weld effect can be prevented.

The fields generated in the grid 1000 are overlaid with the regions from FIG. 9 that can be reached respectively by specific optics.

In some embodiments, when a field lies completely in the coverage region of one optics, the field can potentially be assigned to this optics.

The assignment of the fields to the optics then takes place depending on the distribution of the component geometry, i.e. the actual hatch arrangement in the build field 102, as well as other parameters if applicable that influence the component quality and/or the processing time. A further arrangement into columns and/or rows can also take place according to one of the strategies described above.

FIG. 11 shows a schematic diagram of another division of a layer, or of the build field 102.

The grid 1100 in this example defines columns perpendicular to the gas flow direction of variable width, so that if possible a uniform number and length of hatch vectors are present in each column, which can be distributed uniformly over all optics. This can be approximated over areas to save the calculation time for this.

This leads to utilisation of the global scan surface distribution for classifying the scan progression.

The grid 1100 is thus based on columns with a uniform scan area per optics.

In this example, a minimum number of columns is defined resulting from a minimum width of the columns. In this example the minimum width of a column results from the hatch length and the hatch rotation.

In this example the columns are processed against the gas flow direction 110.

In this example the column boundaries do not necessarily have to be straight lines perpendicular to the gas flow direction but can also be freeforms.

To generate the grid 1100 in FIG. 11, it is possible to start out from the grid 1000 in FIG. 10; the grid 1000 is applied for this purpose to the component structures 104 to be generated in the build plane. Column division then takes place according to a uniform distribution of the vector lengths, exposure times and/or the exposure area to the scanner optics. Starting out from the respective column boundary and the point of intersection of the grid 1100 from FIG. 11 with the grid 1000 of FIG. 10, field boundaries result according to the hatch rotation.

The following information is present for each field in this example: (i) usable optics for scanning the corresponding field; (ii) number of hatch vectors in the field; (iii) length of hatch vectors in the field.

In the examples described here, individual fields are assigned to an optics with the basic idea that as uniform a quantity (i.e. number) and/or length of hatch vectors as possible is assigned to each optics in a column (see grid 1100) in order to guarantee a uniform scan progression.

If an irregular distribution (checking e.g. with reference to grid 1000) cannot be avoided on account of the component geometry, i.e. if one or more optics in a column are necessarily assigned a shorter exposure time than one or more other optics, it can be checked, furthermore, whether regions from a column further right can be prioritised to save build time, but on the premise that the smoke arising thereby does not interfere with the scanning of fields in the columns further left. An example of this is the component structure 1106 in column 6 of the grid in FIG. 11, which only forms an undercut with the component structure in column 1 partly in gas flow direction 110. If the processing beams operating in the lower part of the build field 102 cannot be deflected onto the upper part, these would be directed during processing of the columns 2-5 only briefly onto build field 102 and would be switched off during processing of the upper component structure.

The following fields were already processed in this example: field A2 by optics 1; fields A3 and B3 by optics 2. Currently being processed in this example is the field A6 by optics 4. Yet to be processed in this example are field B6 by optics 4, field A7 by optics 5 and field E2 by optics 2.

Since optics 2 is ready in this example, it is checked whether the next fields assigned to this optics can be exposed. The next field for optics 2 is field E2. This is "released" for exposure when the exposure of the fields marked by the regions 1302 (i.e. the fields lying to the left of regions 1302) is complete. The definition of the regions 1302 is dependent here on the smoke/splash angle and can be dependent on the defined fields or a function (x, y in the build field).

Optics 2 can thus start in this example with the exposure of field E2 as soon as the exposure of field A6 is complete. It is not necessary to waft for the exposure of field B6.

Figure 4:
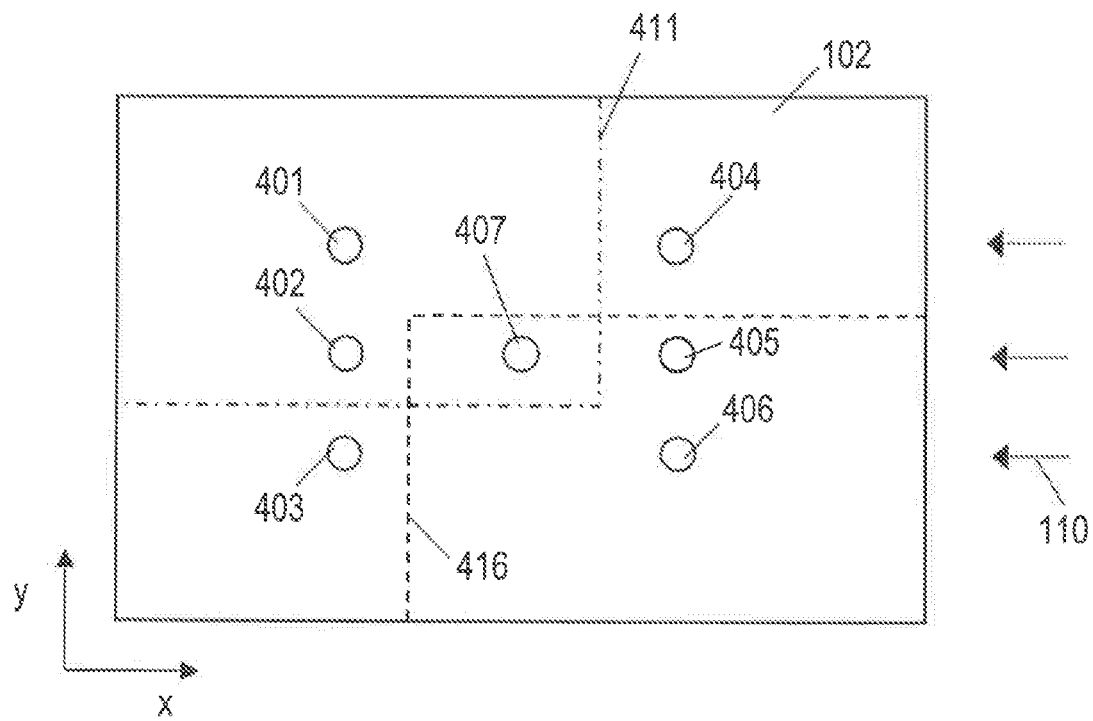
Figure 5:
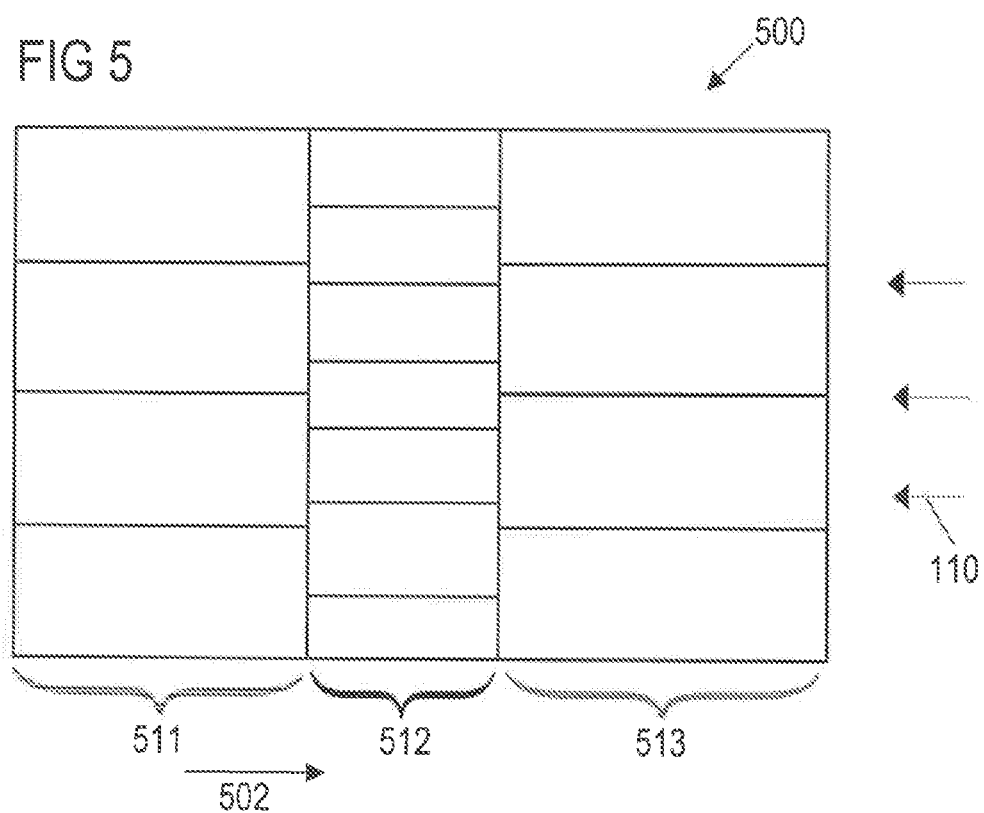
Figure 12:
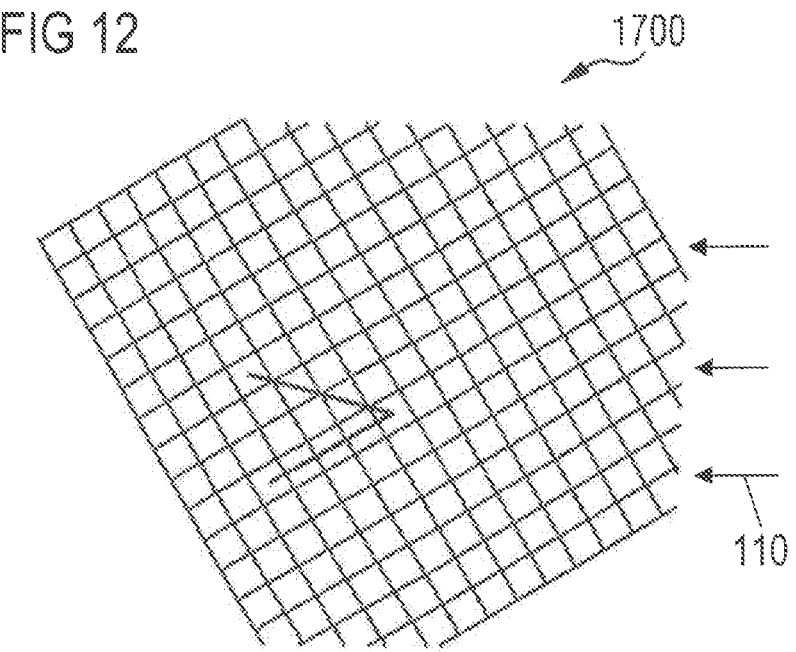
FIG. 12 shows a schematic diagram of such a smoke cone. Restricted regions of a field are all fields to the left of the field that are overlaid by the smoke cone.
Figure 13:
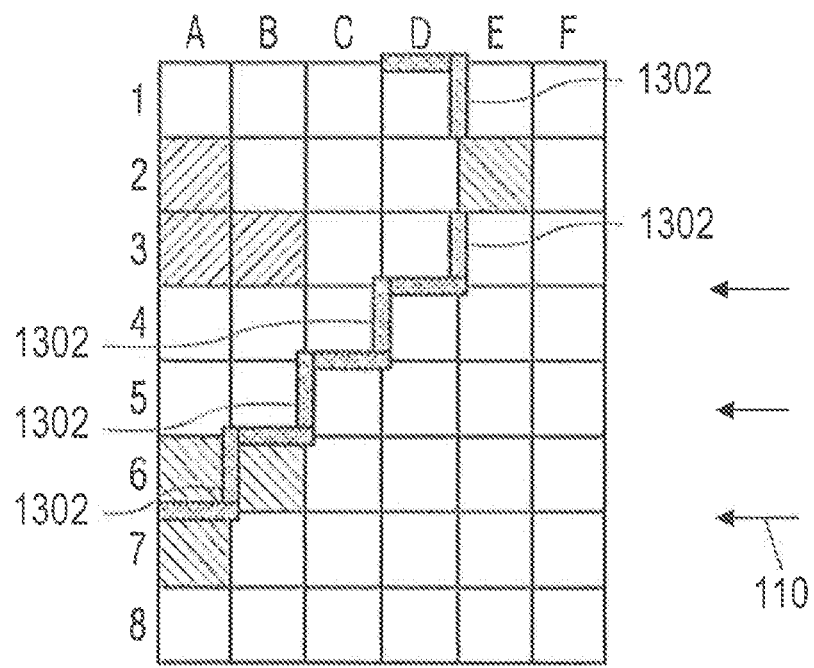
FIG. 13 shows a schematic diagram of another scan strategy.
Figure 14:
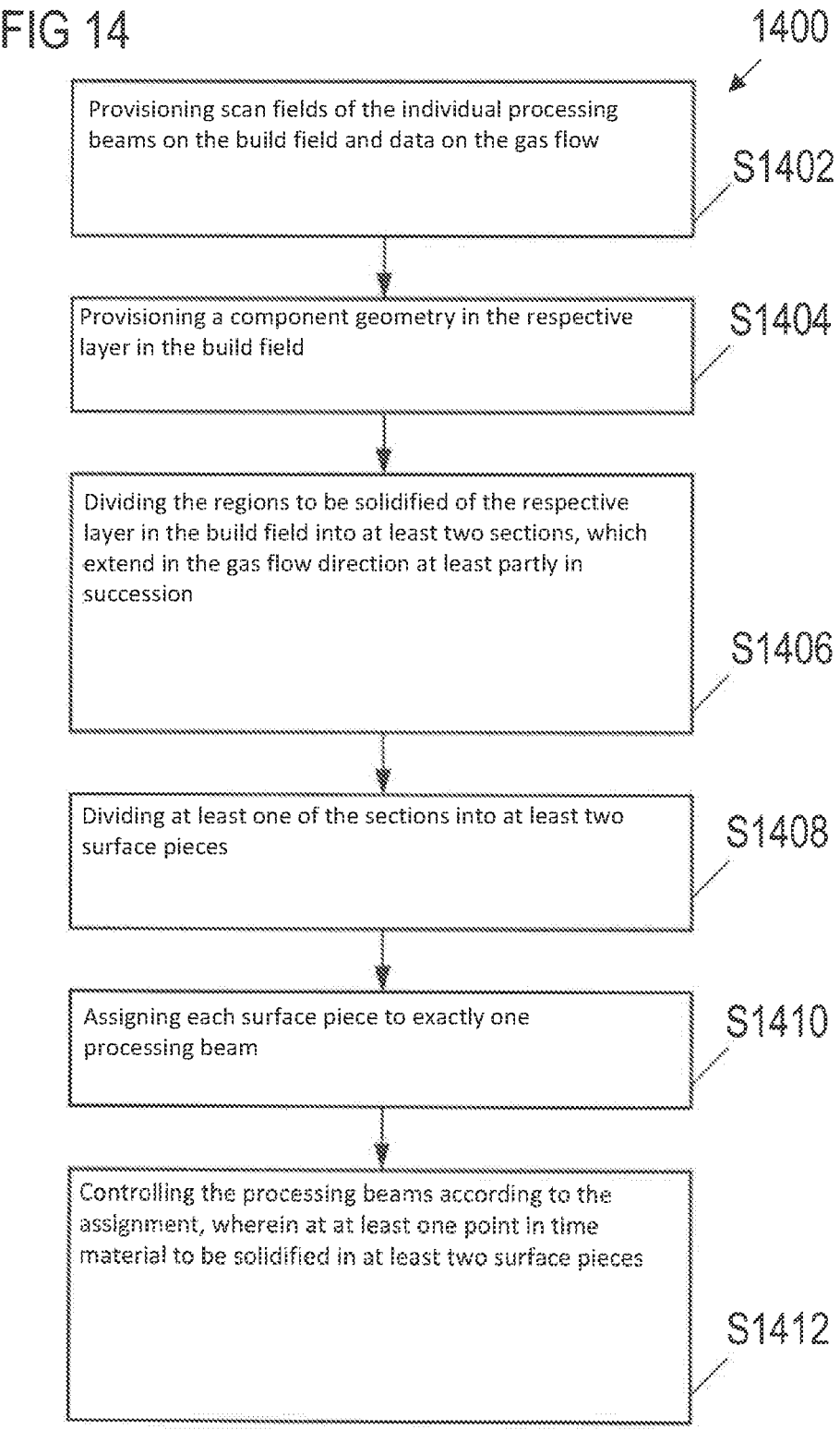

FIG. 14 shows a flow chart of an exemplary control method 1400.

In this example, the control method 1400 comprises a step S1402 for providing the scan fields of the individual processing beams on the build field, i.e. the possible processing regions of the beams for solidifying the material to be solidified in the respective layer in the build field as well as data on the gas flow direction. The parameters of the current machine configuration are thus provided in step S1402.

In step S1404 the component geometry in the respective layer in the build field is provided, i.e. the regions to be selectively solidified.

In step S1406, the regions to be solidified of the respective layer are then divided into at least two sections, which extend at least partly in succession in the gas flow direction. The number and/or position and/or form of the sections can be determined here by the optical configuration of the machine, for example, by the number and processing regions of the beams for solidifying the material. Alternatively or in addition, the number and/or position and/or form of the sections can also be influenced by observation regions of one or more sensors and/or by position and/or form and/or desired quality of the component geometry in the layer to be solidified and/or the vectors resulting therefrom by means of which the beams for solidifying the material are directed over the material layer. The angular deflection of the scanner mirrors and/or the laser power introduced and/or an acceptable influencing due to smoke cones and/or the position of merging regions of hatch vectors and/or a build time optimisation, for example, can also be taken into account for this purpose. The sections can be selected so that the sections, without further division relative to one another, have a relationship of possible negative influencing if at least two sections were processed simultaneously, i.e. in the event of simultaneous processing at least of a part of a section, the processing at least of a part of another section would be negatively influenced.

In step S1408, at least one section is divided into at least two surface pieces. Substantially the same classification criteria apply as for the division into the sections, in particular the number of the possible laser beams for exposure in the section and/or a vector distribution for controlling the beams onto the material to be solidified can be determinative for the number of surface pieces. The surface pieces are preferably selected such that the simultaneous processing of at least two surface pieces in one section is enabled. In particular, one of the methods and strategies described above can be used to divide the surface pieces. The other sections can likewise be divided into surface pieces or only contain one surface piece. Following the division of the at least one section into at least two surface pieces, the material to be solidified in the respective layer is thus divided into at least three surface pieces.

In step S1410, each surface piece is assigned to precisely one processing beam. As described above, contour trains of a component to be produced can run here across several surface pieces and are then considered detached from the assignment, are therefore then not considered in the sense of the invention as part of the surface piece and can thus even be processed by a beam other than the beam assigned to the surface piece. Preferably not only is a processing beam assigned to each surface piece, but furthermore also a processing sequence of all surface pieces assigned respectively to a beam is determined globally or according to section.

A method is preferably selected from the strategies described above that provides the fastest possible processing under required basic conditions (e.g. component quality).

In step S1412, the processing beams are controlled according to the assignment and if applicable assigned sequence, wherein material to be solidified is solidified at least at one point in time in at least two surface pieces, i.e. wherein at least two processing beams irradiate two surface pieces simultaneously.

Individual steps of steps S1402-S1412 can contain substeps, while further steps can also be executed before, between and/or after steps S1402-S1412. The control method 1400 does not have to be used for every layer of the material to be solidified or of the component. It is possible, furthermore, to carry out single or multiple steps outside of a multi-beam apparatus, for example at a computer workstation. Only step S1412 must be executed by a control device of the multi-beam apparatus.

Figure 15:
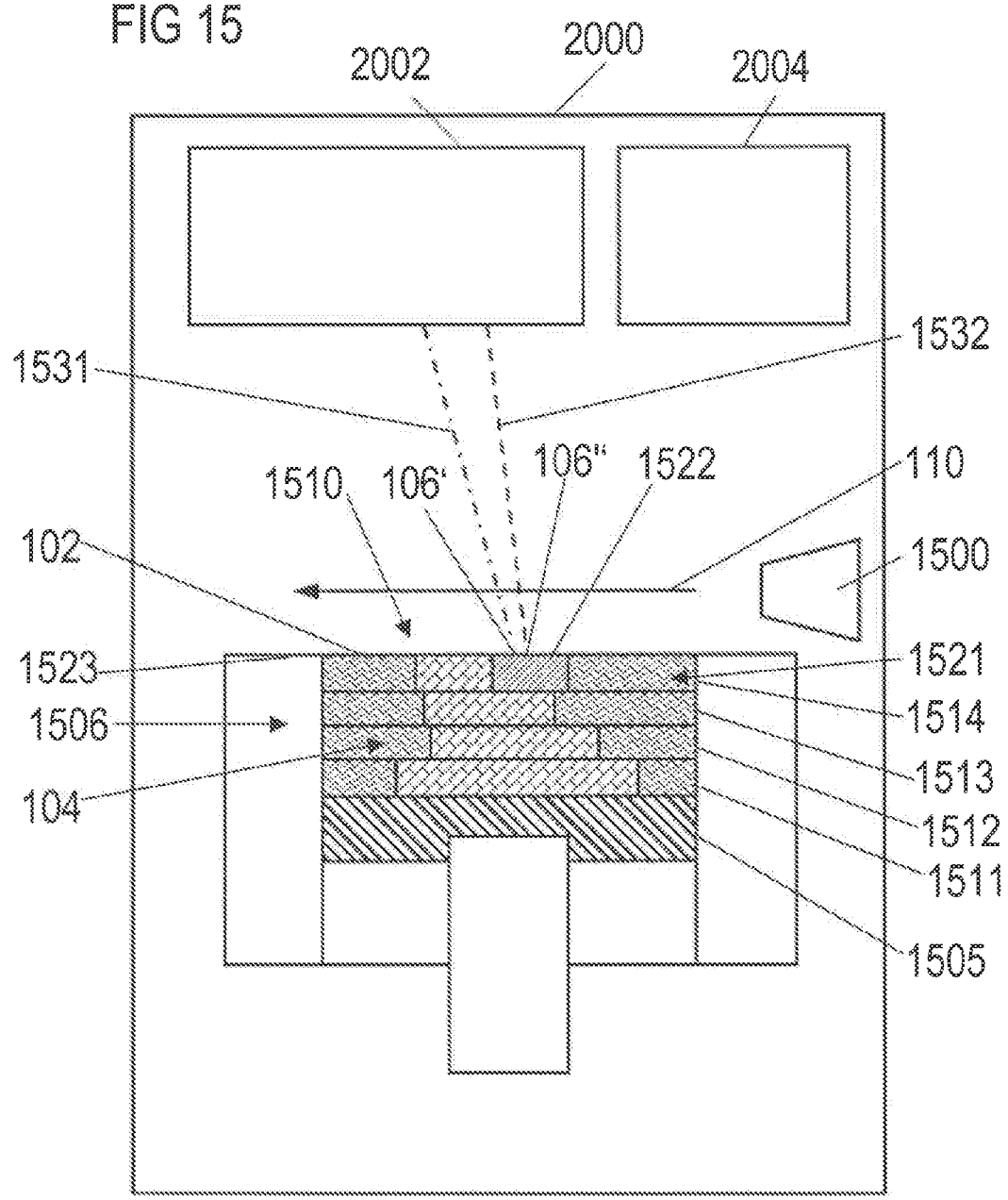

FIG. 15 shows a schematic diagram of a production apparatus 2000. The production apparatus 2000 comprises a multi-beam apparatus 2002 with one or more beam sources for generating a plurality of beams. The multi-bean apparatus can also have one or more optics, e.g. scanner optics. The production apparatus further comprises a control device 2004 connected to the multi-beam apparatus for executing the control method according to the embodiments described herein. In a process chamber, which is not shown, the production apparatus also has a material bed (here a powder bed) 1506 for receiving solidifiable material 1510, due to the selective solidification of which a component 104 is produced. The surface of the material bed 1506 forms the build field 102. Arranged in the material bed 1506 is a vertically adjustable carrier 1505 for receiving the material 1510. The figure shows a point in time in which four layers of material 1511-1514 are already arranged on the carrier, wherein the uppermost material layer 1514 is just being processed. For this purpose a first point of incidence 106' of a first laser beam 1531 and a second point of incidence 106" of a second laser beam 1532 are directed over the build field 102. The uppermost material layer 1514 exhibits different regions, wherein a first region 1521 hatched in a zigzag manner represents solidifiable material which is not provided for solidification. A second obliquely hatched region 1522 represents the material to be solidified to produce the component 104. A third region 1523 hatched in the manner of bricks represents the material already solidified. The production apparatus 2000 can also contain sensors, which are not shown, for example radiation sensors such as e.g. cameras, which can be assigned to the build field 102 and/or the multi-beam apparatus 2002 or can be contained therein and can be connected to the control device 2004. Furthermore, the production apparatus has a gas supply device 1500, e.g. in the form of a nozzle or several nozzles, through which the gas is guided in a gas flow direction 110 (if applicable, locally different for different points of the build field) for transporting away smoke and/or splashes arising during processing over the processing points 106', 106".

Figure 16:
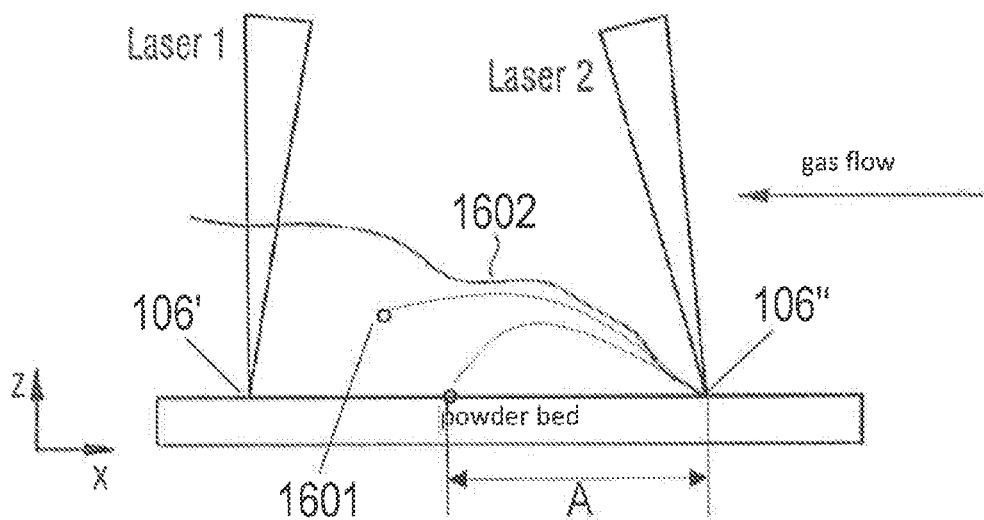
Figure 17:
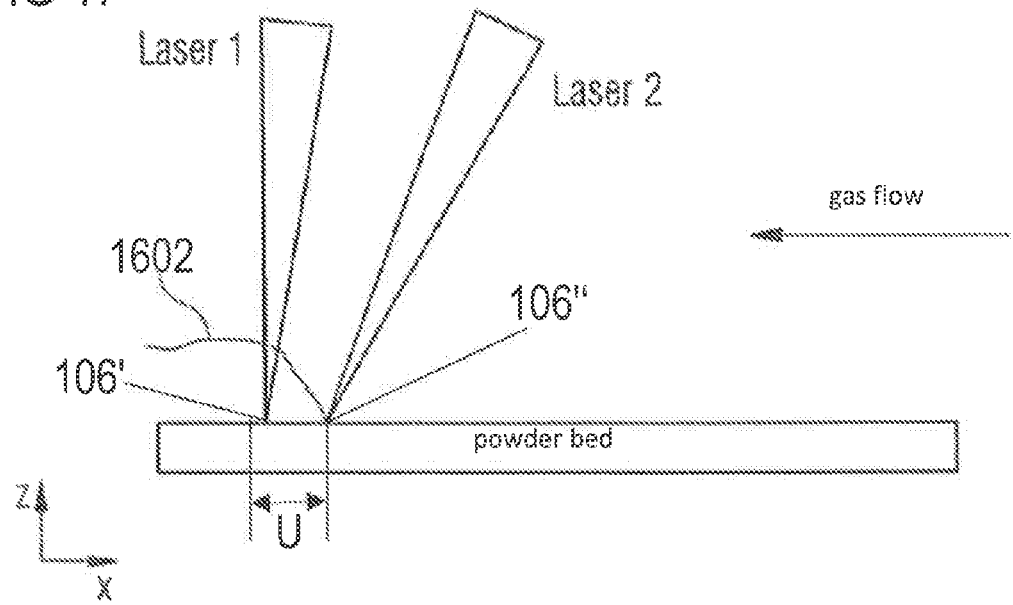

FIGS. 16 and 17 show schematic diagrams of interaction of a laser with splashes 1601 and a smoke trail 1602 produced by a second laser.

In FIG. 16, the laser 1 interacts with the smoke trail 1602, which is caused by laser 2. In this example, the distance between the two lasers in the x-direction is relatively large (in comparison with the example shown in FIG. 17). The smoke trail is relatively strongly pronounced in the z-direction. Laser beam 1 is defocused by the smoke trail. This results in the energy input into the powder bed being reduced.

In FIG. 17, the laser 1 interacts likewise with the smoke trail caused by laser 2. In this example, the distance between the two lasers in the x-direction is relatively small. The smoke trail is relatively modestly pronounced in the z-direction. Laser beam 1 is only weakly defocused by the smoke trail. A reduced energy input into the powder bed can be limited by a defined, maximal distance in the x-direction.

Also depicted in FIGS. 16 and 17 is an extraction distance A as well as a non-interference distance U.

FIG. 18 shows a division of a build field 102 into a first section 1810 and a second section 1820. Section 1810 extends in the gas flow direction behind section 1820. The separation line of the two sections runs diagonally over the build field and is thus oriented to the component structures 104a, 104b in the material layer depicted. According to the invention, the processing of structure 104a will take place at least partly before structure 104b.

FIG. 19 shows a further division of a build field 102 into a first circular section 1910, a second circular section 1920 and a third section 1930, which encloses the two sections 1910 and 1920. The sections can be selected, for example, in such a way because the component structure 104 in the regions of sections 1910 and 1920 has a higher quality requirement, or because the component geometry there may be less advantageous for processing. According to the invention, the processing of sections 1910 and 1920 will take place at least partly before section 1930, if applicable the processing of sections 1910 and 1920 can take place at least partly simultaneously.

FIG. 20 shows a further sectioning. A first section 2010 and a second section 2020 do not contain the entire build field 102 here but are oriented according to a component structure 104. The division can have taken place based on a uniform distribution of the exposure time, for example. In the sense of the invention, section 2010 is processed at least partly before section 2020.

Figure 21:
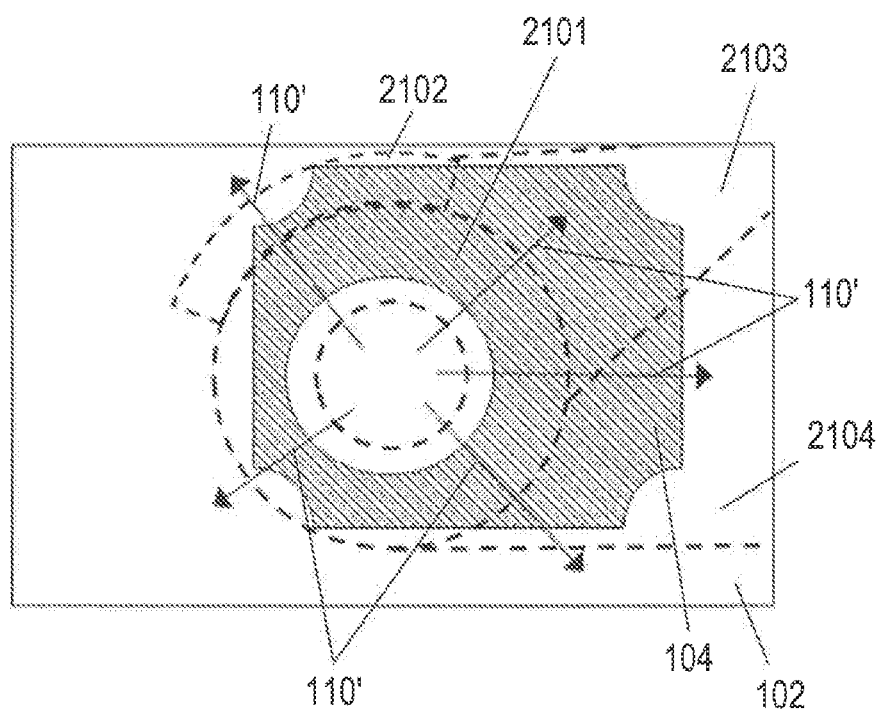

FIG. 21 shows another division of the material layer or of the build field 102 or of the component 104. In this example, a gas flow direction 110' running radially outwards from a centre of the build field is assumed. The build field contains a first section 2101, a second section 2102, a third section 2103 and a fourth section 2104. All other sections extend completely behind section 2101 in the gas flow direction 110'. In addition, the fourth section 2104 extends partly behind the third section 2103 in the gas flow direction 110'.

Figure 22:
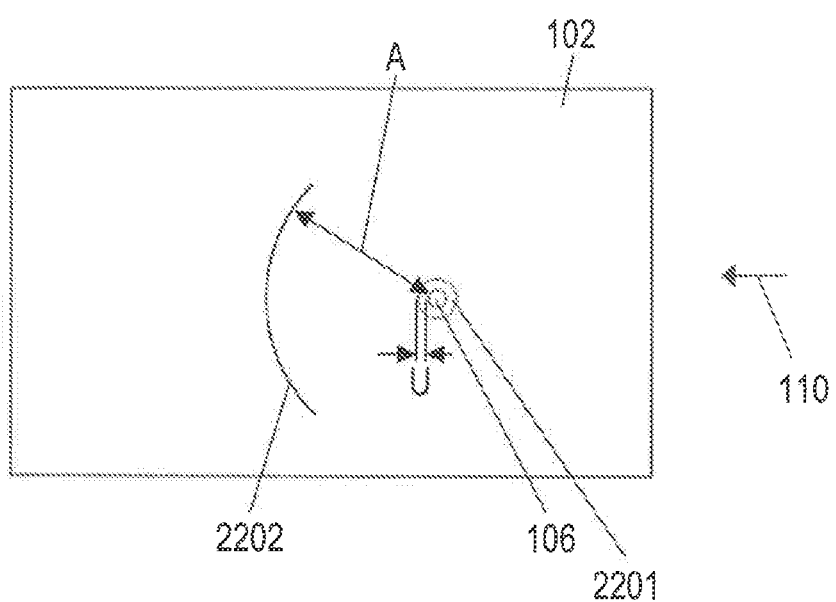

FIG. 22 shows a point of incidence 106 of a first laser beam on the material layer located in the build field 102. Around the processing point 106 a non-interference zone 2201 is created with the non-interference distance U as radius (if assumed from the processing point 106 as a point without inherent extension) or curve distance, in which zone simultaneous irradiation of a second laser beam could take place. A curved piece 2202 shows with the extraction distance as radius, or curve distance, a boundary behind which no simultaneous or later exposure of the first or second laser should take place in the gas flow direction.

The following examples are likewise included by the present disclosure and can be taken up entirely or partly in embodiments of the invention described herein:

1. Control method for controlling a multi-beam apparatus with one or more beam sources for producing a plurality of beams for a system for manufacturing a three-dimensional workpiece by means of an additive layer construction method, the control method comprising:
    controlling the plurality of beams such that the beams are substantially arranged along a line when encountering a surface of a carrier to which a material to be solidified by the plurality of beams is applied for manufacturing the three-dimensional workpiece, wherein the line lies substantially perpendicular to a gas flow direction of a gas flow that is used to remove smoke arising during solidification by the beams of the material to be solidified,
    wherein the beams for solidifying a layer of the material to be solidified for manufacturing the three-dimensional workpiece are controlled substantially against the gas flow direction of the gas flow over the surface of the carrier;
    wherein the control method further comprises:
    division of the layer of the material to be solidified into a predetermined number of sections, wherein each of the sections extends substantially perpendicular to the gas flow direction of the gas flow,
    division of each of the sections into a predetermined number of surface pieces, wherein each of the surface pieces is assigned to one or more specific beams of the plurality of beams, which solidify the material to be solidified in the assigned surface piece, and wherein each of the sections is divided into the surface pieces based on a predefined minimum distance and/or maximum distance between adjacent beams upon incidence of the beams onto the surface of the carrier during the solidification of the layer of material to be solidified for manufacturing the three-dimensional workpiece.

2. Control method according to example 1, wherein the predetermined number of surface pieces into which the corresponding section is divided is defined based on an extension of the section perpendicular to the gas flow direction of the gas flow, and wherein the extension is based on an extension of the three-dimensional workpiece in the layer to be solidified.

3. Control method according to example 1 or 2, wherein the surface pieces in a section comprise equidistant surface pieces.

4. Control method according to one of examples 1 to 3, wherein the predetermined number of surface pieces of each of the sections corresponds to a number of the plurality of beams.

5. Control method according to one of examples 1 to 4, wherein the division of the layer is based on a number of vectors, which are assigned to the respective beams, wherein the vectors define a scanning process of the layer by the beams.

6. Control method according to one of examples 1 to 5, wherein each of the surface pieces that is assigned to a specific beam of the plurality of beams is divided into a plurality of irradiation fields based on a beam diameter of the specific beam.

7. Control method according to example 6, wherein a closed contour train for producing a contour of the three-dimensional workpiece is assigned to fewer than a specific number of the plurality of beams.

8. Control method according to one of examples 1 to 7, wherein the layer of the material to be solidified is divided into the surface pieces by means of a grid or a superimposition of a plurality of grids.

9. Control method according to example 8, wherein a first grid divides the layer into regions that can be maximally reached by the plurality of beams.

10. Control method according to example 9, wherein the regions are configured via points of perpendicular beam incidences and an extension in the x-y direction with reference to the surface of the carrier.

11. Control method according to one of examples 8 to 10, wherein a second grid divides the layer of material to be solidified according to a vector orientation of vectors of the beams, wherein the vectors define a progression of the beams.

12. Control method according to example 11, wherein the vectors comprise hatch vectors, and wherein the second grid divides the layer of material to be solidified according to the vector orientation of the hatch vectors in a hatch pattern based on a hatch distance and a hatch rotation of the hatch pattern, wherein the hatch vectors define the progression of the beams.

13. Control method according to example 11 or 12, wherein a region in which the vectors merge is not divided into different sections that are assigned to different beams.

14. Control method according to example 13, wherein the vector orientation of the vectors in the region are defined such that vectors in the region do not converge.

15. Control method according to one of examples 11 to 14, if dependent on one of examples 9 or 10, wherein the layer is divided into the surface pieces based on the superimposition of the first grid with the second grid.

16. Control method according to one of examples 1 to 15, wherein the sections comprise columns, which run substantially perpendicular to the gas flow direction of the gas flow, and wherein an extension of the respective column parallel to the gas flow direction of the gas flow is defined such that each of the columns has an identical number and/or an identical length of vectors of the beams.

17. Control method according to example 16, if dependent on example 15, wherein the superimposition comprises a superimposition of the first and second grids with the columns.

18. Control method according to one of examples 1 to 17, wherein the layer is divided based on a number of beam sources usable for a field of the layer for scanning the field, a number of vectors in the field and a length of the vectors.

19. Control method according to one of examples 1 to 18, wherein an identical number and/or length of vectors is assigned to each of the beam sources in one of the sections.

20. Control method according to one of examples 1 to 19, further comprising:
    determination, based on irradiation of the material in the layer in a first surface piece by one of the beams, of a region, with reference to the surface of the carrier, of the smoke and/or splashes arising due to the irradiation in the first surface piece, and
    determination, based on the region of the smoke and/or the splashes, of whether a second surface piece can be irradiated by the beam or another beam, taking account of a position of the beam or of the other beams on encountering the layer relative to the region of the smoke and/or the splashes.

21. Control method according to one of examples 1 to 20, wherein the beams comprise laser beams.

22. Computer program, which can be loaded into a programmable control device, with a program code for executing a control method according to one of examples 1 to 21 when the computer program is executed on the control device.

23. Data carrier containing the computer program according to example 22, wherein the data carrier comprises an electrical signal, an optical signal, a radio signal or computer-readable storage medium.

24. Control device for controlling a multi-beam apparatus with one or more beam sources for producing a plurality of beams for a system for manufacturing a three-dimensional workpiece by means of an additive layer construction method, wherein the control device comprises:

one or more processors; and
a memory, which contains instructions that can be executed by the one or more processors, whereby the control device can be operated to execute the method according to one of examples 1 to 21.

25. Production apparatus for manufacturing a three-dimensional workpiece by means of an additive layer construction method, wherein the production apparatus comprises:
    a multi-beam apparatus with one or more beam sources for producing a plurality of beams; and
    the control device according to example 24.

The invention claimed is:

1. A control method for controlling a multi-beam apparatus having one or more beam sources for producing a plurality of beams of a system for manufacturing a three-dimensional workpiece by means of an additive layer construction method, in which a solidifiable material for manufacturing the three-dimensional workpiece is applied in layers to a surface of a carrier and the solidifiable material in a respective layer is solidified by the plurality of beams at respective points of incidence of the plurality of beams on the solidifiable material,
    wherein the points of incidence of the beams for solidifying selective regions of one of the layers of the solidifiable material for manufacturing the three-dimensional workpiece are each controlled substantially against a gas flow direction of a gas flow over the surface of the carrier;
wherein the control method comprises:
    (a) dividing the material to be solidified in the respective layer into at least two sections, wherein two of the at least two sections extend in the gas flow direction of the gas flow prevailing over the two of the at least two sections at least partly in succession,
    (b) dividing at least one of the two of the at least two sections into at least two surface pieces,
    (c) assigning each of the surface pieces to precisely one specific beam, which solidifies the material to be solidified in the assigned surface piece,
    (d) controlling the points of incidence of the beams such that, at one point in time at least during an exposure of the material to be solidified, the material to be solidified is solidified in at least two surface pieces, and a network of straight lines running between each centre point of the points of incidence to every other centre point of the points of incidence at no point in time during the exposure, in which all centre points of the points of incidence are located outside of a predetermined distance from one another, has a straight line parallel to the gas flow direction of the gas flow prevailing over the two of the at least two sections.

2. The control method according to claim 1, wherein the points of incidence of the beams are controlled at least partly continuously over the surface of the carrier.

3. The control method according to claim 1, wherein at least two of the centre points of the points of incidence are located outside of the predetermined distance from one another for at least a predetermined period, and wherein all centre points of the points of incidence are located outside of the predetermined distance from one another for at least the predetermined period.

4. The control method according to claim 1, wherein before the assignment of the surface pieces to precisely one specific beam, each of the surface pieces is assigned by its position to the surface of the carrier and/or to a gas flow outlet of the gas flow to one or more specific beams of the plurality of beams.

5. The control method according to claim 1, wherein a position and/or an extension of the sections on the surface of the carrier and/or a number of sections are defined based on:
   an extension and/or position of the three-dimensional workpiece in the layer of the solidifiable material, and/or
   a position of scan fields of the beams, which are configured via points of perpendicular beam incidences and an extension with reference to the surface of the carrier and/or an angle to the axis of the respective perpendicular beam incidence.

6. The control method according to claim 1, wherein (i) all sections are defined in the direction perpendicular to the gas flow direction of the gas flow with the same extension, or (ii) wherein all sections are defined in the gas flow direction of the gas flow with the same extension.

7. The control method according to claim 1, wherein the exposure of each surface piece in a second section, which extends in the gas flow direction at least partly ahead of another first section, is only commenced after the material to be solidified of all surface pieces of the first section has been completely irradiated.

8. The control method according to claim 1, wherein each point of incidence is controlled such that this is not located in the gas flow direction outside of an extraction distance from a point at which the material to be solidified of the respective layer was already irradiated.

9. The control method according to claim 1, wherein (i) a number of surface pieces, into which the corresponding section is divided, is defined based on an extension of the section perpendicular to the gas flow direction of the gas flow and/or a position of the section in the layer of solidifiable material, or (ii) wherein a number of surface pieces in a section is defined by a number of the beams maximally exposing at the same time in the section or a multiple thereof.

10. The control method according to claim 1, wherein (i) the division of the material to be solidified of the layer is based on a number and/or length of vectors assigned to the respective beams, wherein the vectors define a scanning process of the layer by the beams, or (ii) wherein the division of the material to be solidified of the layer is based on an exposure time assigned to the respective beams, in particular substantially uniformly distributed.

11. The control method according to claim 1, wherein each of the surface pieces assigned to a specific beam of the plurality of beams is divided into a plurality of irradiation fields based on a beam diameter of the specific beam.

12. The control method according to claim 1, wherein a closed contour train for producing a contour of the three-dimensional workpiece is assigned independently of the position of the contour train in the surface pieces to one or more beams, in particular to just one beam.

13. The control method according to claim 1, wherein the material to be solidified in the respective layer is divided into the surface pieces by means of a grid or a superimposition of a plurality of grids, (i) wherein a first grid divides the layer into regions, which are each reached by one or more beams, wherein the regions are configured via points of perpendicular beam incidences and an extension with reference to the surface of the carrier and/or an angle to the axis of the respective perpendicular beam incidence, and/or (ii) wherein a second grid divides the material to be solidified in the respective layer according to a vector orientation of vectors of the beams, wherein the vectors define a progression of the beams, in particular wherein the vector orientation of the vectors in adjoining surface pieces is defined such that vectors at the surface boundaries do not converge.

14. The control method according to claim 1, wherein the sections are designed as columns running substantially perpendicular to the gas flow direction of the gas flow, and wherein an extension of respective column parallel to the gas flow direction of the gas flow is defined such that each of the columns has an identical number and/or an identical length of processing vectors and/or an identical computational exposure time.

15. The control method according to claim 1, wherein at least one section is divided into surface pieces such that an identical number of beams usable for the material to be solidified in each surface piece for exposing the surface piece and/or a substantially identical number of vectors in each surface piece and/or a substantially identical sum of the length of the vectors in each surface piece and/or a substantially identical exposure time in each surface piece is achieved.

16. The control method according to claim 1, wherein in at least one section, an identical number and/or total length of vectors and/or an identical exposure time and/or an identical number of surface pieces is assigned to each of the beams to which at least one surface piece in the section was assigned.

17. The control method according to claim 1, further comprising:
   determining, based on irradiation of the material to be solidified in the layer in a first surface piece by one of the beams, a region, with reference to the surface of the carrier, in which an occurrence is expected of smoke and/or splashes arising due to the irradiation in the first surface piece, and
   determining, based on the region in which the occurrence of smoke and/or the splashes is expected, of whether a second surface piece can be irradiated by the beam or another beam.

18. The control method according to claim 1, wherein the beams comprise laser beams, in particular wherein all beams are laser beams, in particular (i) wherein all laser beams have a substantially identical wavelength and/or a substantially identical power and/or an identical, in particular punctiform, form of the point of incidence, or (i) wherein the beams comprise at least two laser beams, which have a different wavelength and/or a different power and/or a different form of the point of incidence.

19. A computer program, which can be loaded into a programmable control device, with a program code for executing the control method according to claim 1 when the computer program is executed on the control device, in particular wherein the computer program is contained in a data carrier comprising an electrical signal, an optical signal, a radio signal or computer-readable storage medium.

20. A control device for controlling a multi-beam apparatus with one or more beam sources for producing a plurality of beams for a system for manufacturing a three-dimensional workpiece by means of an additive layer construction method, wherein the control device comprises:
   one or more processors; and
   a memory, which contains instructions that can be executed by the one or more processors, whereby the control device can be operated to execute the method according to claim 1.

* * * * *